(12) United States Patent
Kaneko

(10) Patent No.: US 11,236,410 B2
(45) Date of Patent: Feb. 1, 2022

(54) ALUMINUM ALLOY MATERIAL, AND CONDUCTIVE MEMBER, BATTERY MEMBER, FASTENING PART, SPRING PART, AND STRUCTURAL PART USING ALUMINUM ALLOY MATERIAL

(71) Applicant: FURUKAWA ELECTRIC CO., LTD., Tokyo (JP)

(72) Inventor: Hiroshi Kaneko, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/979,654

(22) PCT Filed: Mar. 15, 2019

(86) PCT No.: PCT/JP2019/010971
§ 371 (c)(1),
(2) Date: Sep. 10, 2020

(87) PCT Pub. No.: WO2019/188451
PCT Pub. Date: Oct. 3, 2019

(65) Prior Publication Data
US 2021/0025033 A1 Jan. 28, 2021

(30) Foreign Application Priority Data
Mar. 27, 2018 (JP) .............................. JP2018-059187

(51) Int. Cl.
*C22C 21/00* (2006.01)
*C22C 21/08* (2006.01)
*C22F 1/04* (2006.01)

(52) U.S. Cl.
CPC .............. *C22C 21/00* (2013.01); *C22C 21/08* (2013.01); *C22F 1/04* (2013.01)

(58) Field of Classification Search
None
See application file for complete search history.

(56) References Cited

U.S. PATENT DOCUMENTS

| 2010/0247369 A1 | 9/2010 | Morimoto |
| 2017/0250003 A1 | 8/2017 | Yoshida et al. |

(Continued)

FOREIGN PATENT DOCUMENTS

| CN | 107109544 A | 8/2017 |
| CN | 107475572 A | 12/2017 |

(Continued)

OTHER PUBLICATIONS

International Search Report dated Jun. 11, 2019 in PCT/JP2019/010971 filed on Mar. 15, 2019 citing documents AA-AB and AT-AV therein, 1 page.

(Continued)

*Primary Examiner* — Daniel J. Schleis
(74) *Attorney, Agent, or Firm* — Oblon, McClelland, Maier & Neustadt, L.L.P.

(57) ABSTRACT

This aluminum alloy material has an alloy composition which comprises at least one among 0.05-1.50 mass % of Fe, 0.01-0.15 mass % of Si, 0.01-0.3 mass % of Cu, and 0.01-1.5 mass % of Mg, with the balance being Al and inevitable impurities, and has a fibrous metal structure in which crystal grains extend in one direction. In a cross section parallel to said one direction, the average value of the dimensions of the crystal grains in a direction perpendicular to the longitudinal direction thereof is 800 nm or less, and the primary surface of the aluminum alloy material has a crystal orientation distribution in which the ratio H (K100/K111) of K100 to K111 is at least 0.15 as determined by the X-ray pole figure method, where K100 is the sum of the diffraction intensities resulting from crystals in which <100> is oriented in the longitudinal direction, and K111 is the sum of the (Continued)

diffraction intensities resulting from crystals in which <111> is oriented in the longitudinal direction. The aluminum alloy material has sufficient strength and workability to replace iron-based or copper-based metal materials.

20 Claims, 9 Drawing Sheets

(56) References Cited

U.S. PATENT DOCUMENTS

| | | | |
|---|---|---|---|
| 2019/0127826 A1 | 5/2019 | Kaneko et al. | |
| 2019/0136351 A1 | 5/2019 | Kaneko et al. | |
| 2020/0040432 A1 | 2/2020 | Kaneko | |

FOREIGN PATENT DOCUMENTS

| | | | |
|---|---|---|---|
| JP | 5-331585 A | 12/1993 | |
| JP | 2628235 B2 | 4/1997 | |
| JP | 9-137244 A | 5/1997 | |
| JP | 2001-131721 A | 5/2001 | |
| JP | 2003-27172 A | 1/2003 | |
| JP | 2010-159445 A | 7/2010 | |
| JP | 2013-044039 A | 3/2013 | |
| JP | 2017-179545 A | 10/2017 | |
| WO | WO 2018/012481 A1 | 1/2018 | |
| WO | WO 2018/012482 A1 | 1/2018 | |
| WO | WO 2018/181505 A1 | 10/2018 | |

OTHER PUBLICATIONS

Combined Chinese Office Action and Search Report dated Apr. 30, 2021 in corresponding Chinese Patent Application No. 201980006795.8 (with English Translation and English Translation of Category of Cited Documents) citing documents AO-AR therein, 15 pages.

Extended European Search Report issued in European Application No. EP19775968.1, dated Nov. 29, 2021, 6 pages.

FIG. 2. Wire textures of various f.c.c. metals and alloys as a function of the parameter $\gamma/Gb$. Stacking-fault energy increases towards the right side of the figure. Both high and low SFE lead to sharp ⟨111⟩ textures.

(200)X-RAY POLE FIGURE OF EXAMPLE 28 OF PRESENT INVENTION (200)X-RAY POLE FIGURE OF COMPARATIVE EXAMPLE 9

ALUMINUM ALLOY MATERIAL, AND CONDUCTIVE MEMBER, BATTERY MEMBER, FASTENING PART, SPRING PART, AND STRUCTURAL PART USING ALUMINUM ALLOY MATERIAL

TECHNICAL FIELD

The present invention relates to an aluminum alloy material, in particular, relates to an aluminum alloy material having a high strength and excellent workability. Such an aluminum alloy material is used in a wide range of application, for example, a conductive member, a battery member, a fastening part, a spring part, a structural part, and a cabtire cable.

BACKGROUND ART

Recently, a technology of forming a three-dimensional structure body into a desired shape by sintering a metal powder with an electron beam, laser, or the like, has been widely considered, in accordance with the diversification of the shape of a metal member. However, in such a technology, the metal powder is used, but in a case where the metal powder is excessively fined, there is a problem that explosion easily occurs.

For this reason, recently, for example, a technology of forming a three-dimensional structure by a method such as twisting, knitting, weaving, binding, joining, and connecting metal fine wires has been developed. Such a method, for example, has been considered as Wire-Woven Cellular Materials, and has been expected to be applied to a battery part, a heat sink, an impact absorption member, and the like.

In addition, an iron-based wire rod or a copper-based wire rod has been widely used as the metal fine wire as described above, but recently, an aluminum-based material in which specific weight is small, a thermal expansion coefficient is large, electric or thermal conductive properties are comparatively excellent, corrosion resistance is excellent, an elastic coefficient is particularly small, and elastic deformation is flexibly performed, compared to an iron-based metal material or a copper-based metal material, has been considered as the replacement for the iron-based wire rod or the copper-based wire rod.

In a conductive member, for example, a cable of a solar panel promising as a leader of regenerated energy, a technology of not only providing the panel on a roof or a wall, but also changing the angle of the panel at every moment in order to increase a power generation efficiency has been developed. For this reason, the application of a lightweight aluminum-based material is promising, and excellent electric conductive properties, an excellent strength for withstanding a repetitive motion or an external force of installation work, and excellent bending formability are required.

In a battery member, for example, a new structure in which an active material is buried in a gap is considered as a netted electrode. Excellent thermal dissipation properties, excellent strength properties such that disconnection due to the expansion and contraction of the active material or an external force during a manufacturing process does not occur, excellent electric conductive properties, an excellent fatigue strength with respect to repetitive motion, and excellent bending formability are required.

In a fastening part, for example, a material having a large thermal expansion coefficient is required. Recently, the materials of various cases or housings have been changed to a lightweight material such as an aluminum alloy, a titanium alloy, a magnesium alloy, and plastic from the iron-based material of the related art, and such a material has a large thermal expansion coefficient. This is because in the case of fastening a housing containing such a material by a screw, a bolt, a staple, a binding wire, or the like, a large difference between thermal expansion coefficients of the material of the housing and the material of a fastening part is directly linked to the loosening of fastening. However, a general aluminum alloy has a large thermal expansion coefficient, but has an insufficient strength, and thus, is required to increase the strength.

In a spring part, for example, in the case of a small precise coil spring, not only strength properties but also bending workability is required. In addition, in order to prevent dimension accuracy from being degraded due to thermal expansion, a reduction in a temperature distribution or thermal dissipation properties are important, and excellent thermal conductive properties are required.

For example, a 2000-based (Al—Cu-based) aluminum alloy material or a 7000-based (Al—Zn—Mg-based) aluminum alloy material that is an aluminum alloy material having a comparatively high strength is considered as the aluminum alloy material that is used in such various parts, but such an aluminum alloy material has a problem such as poor electric or thermal conductive properties, poor corrosion resistance, poor stress corrosion cracking resistance, and the like. A 6000-based (Al—Mg—Si-based) has also a problem such as poor conductivity. In addition, any alloy has a problem in which bending formability is degraded in the case of increasing a strength.

On the other hand, a method of crystallizing an aluminum alloy material having an amorphous phase (Patent Document 1), a fine crystal grain forming method according to an ECAP method (Patent Document 2), a fine crystal grain forming method according to cold working at a temperature of a room temperature or less (Patent Document 3), a method of dispersing carbon nanofibers (Patent Document 4), or the like is known as a method of increasing the strength of the aluminum alloy material. However, in any of these methods, the aluminum alloy material to be manufactured has a small size and is difficult to be industrially commercialized.

In addition, in Patent Document 5, a method of obtaining an Al—Mg-based alloy having a fine structure by controlling a rolling temperature is disclosed. Such a method is excellent in industrial mass-producibility, but has a problem in further increasing the strength.

In addition, in such methods, in the case of further increasing the strength, there is a problem that bending workability or conductivity that is properties opposite to the strength decreases. For this reason, for example, in a case where the aluminum alloy material is used as the fine wire for forming the three-dimensional structure body as described above, it is also required to improve the bending workability and the conductivity, along with an increase in the strength.

Patent Document 1: Japanese Unexamined Patent Application, Publication No. H05-331585
Patent Document 2: Japanese Unexamined Patent Application, Publication No. H09-137244
Patent Document 3: Japanese Unexamined Patent Application, Publication No. 2001-131721
Patent Document 4: Japanese Unexamined Patent Application, Publication No. 2010-159445

Patent Document 5: Japanese Unexamined Patent Application, Publication No. 2003-027172

DISCLOSURE OF THE INVENTION

Problems to be Solved by the Invention

An object of the present invention is provide an aluminum alloy material having a high strength, excellent electric or thermal conductive properties (electric conductive properties), and excellent bending workability, and a conductive member, a battery member, a fastening part, a spring part, a structural part, and a cabtire cable using the aluminum alloy material.

Means for Solving the Problems

As a result of intensive studies of the present inventors, it has been found that an aluminum alloy material has a predetermined alloy composition and a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method, and thus, an aluminum alloy material having a high strength, excellent electric or thermal conductive properties, and excellent bending workability can be obtained, and the present invention has been completed on the basis of such a finding.

That is, an overview configuration of the present invention is as follows.

(1) An aluminum alloy material having an alloy composition comprising at least one among 0.05 mass % to 1.50 mass % of Fe, 0.01 mass % to 0.15 mass % of Si, 0.01 mass % to 0.3 mass % of Cu, and 0.01 mass % to 1.5 mass % of Mg, with the balance being Al and inevitable impurities, in which the aluminum alloy material has a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method.

(2) An aluminum alloy material having an alloy composition comprising at least one among 0.05 mass % to 1.50 mass % of Fe, 0.01 mass % to 0.15 mass % of Si, 0.01 mass % to 0.3 mass % of Cu, and 0.01 mass % to 1.5 mass % of Mg, and a total of 0.3 mass % or less of one or more selected from the group consisting of RE, Ag, Ni, Mn, Cr, Zr, Ti, and B, with the balance being Al and inevitable impurities, in which the aluminum alloy material has a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method.

(3) The aluminum alloy material according to (1) or (2) described above, in which a Vickers hardness (HV) is 60 to 250.

(4) The aluminum alloy material according to (1), (2), or (3) described above, in which the surface is covered with one or more of metals or alloys selected from the group consisting of Cu, Ni, Ag, Au, Pd, and Sn.

(5) A conductive member using the aluminum alloy material according to any one of (1) to (4) described above.

(6) A battery member using the aluminum alloy material according to any one of (1) to (4) described above.

(7) A fastening part using the aluminum alloy material according to any one of (1) to (4) described above.

(8) A spring part using the aluminum alloy material according to any one of (1) to (4) described above.

(9) A structural part using the aluminum alloy material according to any one of (1) to (4) described above.

(10) A cabtire cable using the aluminum alloy material according to any one of (1) to (4) described above.

Effects of the Invention

According to the present invention, the aluminum alloy material has a predetermined alloy composition and a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method, and thus, an aluminum alloy material having a high strength, excellent electric or thermal conductive properties, and excellent bending workability, a conductive member, a battery member, a fastening part, a spring part, a structural part, and a cabtire cable using the aluminum alloy material can be obtained.

PREFERRED MODE FOR CARRYING OUT THE INVENTION

Figure 1:
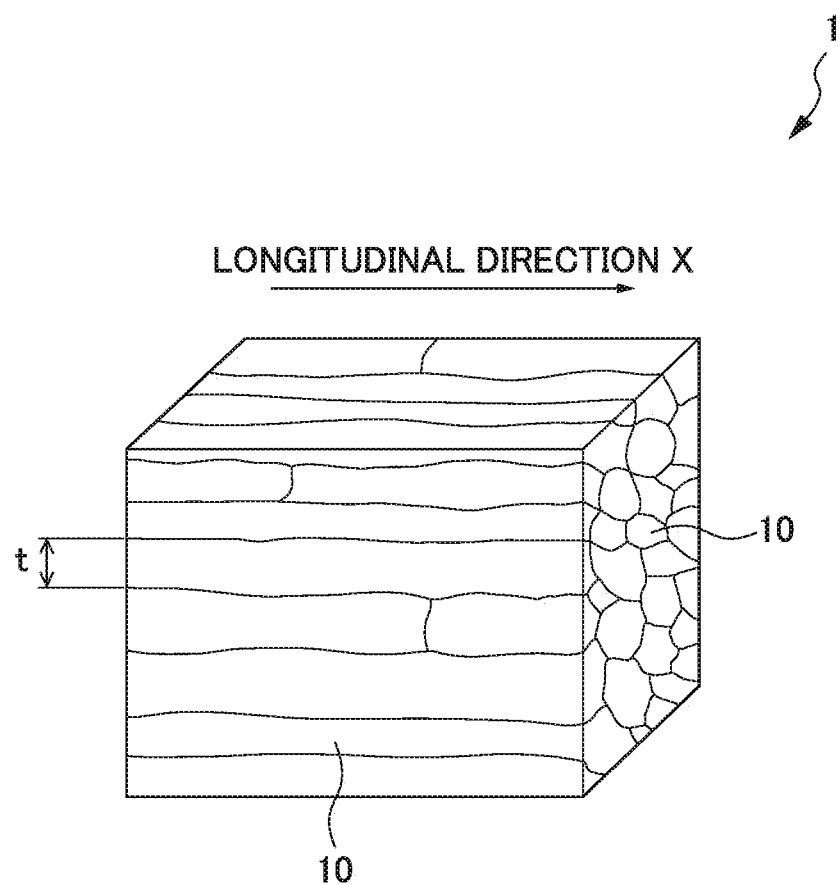
FIG. 1 is a perspective view schematically illustrating a state of a metal structure of an aluminum alloy material according to the present invention.

Hereinafter, a preferred embodiment of an aluminum alloy material of the present invention will be described in detail. An aluminum alloy material according to the present invention is an aluminum alloy material having an alloy composition comprising at least one among 0.05 mass % to 1.50 mass % of Fe, 0.01 mass % to 0.15 mass % of Si, 0.01 mass % to 0.3 mass % of Cu, and 0.01 mass % to 1.5 mass % of Mg, and as necessary, a total of 0.3 mass % or less of one or more selected from the group consisting of RE, Ag, Ni, Mn, Cr, Zr, Ti, and B, with the balance being Al and inevitable impurities, in which the aluminum alloy material has a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method.

Herein, the "crystal grains" indicate a portion surrounded by a misorientation boundary, and here, the "misorientation boundary" indicates a boundary in which a contrast (a channeling contrast) is discontinuously changed in a case where a metal structure is observed by using a transmission electron microscope (TEM), a scanning transmission electron microscope (STEM), a scanning ion microscope (SIM), or the like. In addition, the dimensions of the crystal grains in the direction perpendicular to the longitudinal direction correspond to the intervals of the misorientation boundaries.

In addition, the "primary surface" is a surface of the aluminum alloy material that is parallel to a working direction (a drawing direction), and indicates a surface that is directly in contact with a tool (a rolling roll or a drawing die) and is subjected to swaging (thickness-reduction working) (hereinafter, a worked surface). For example, the primary surface (the worked surface) in a case where the aluminum alloy material is a wire and rod material is the surface of the wire and rod material that is parallel to a wire drawing direction (a longitudinal direction) (an outer circumferential surface), and the primary surface (the worked surface) in a case where the aluminum alloy material is a board is the surface of the board that is in contact with a rolling roller or the like (two surfaces on the front and back), in surfaces parallel to a rolling direction.

Here, the working direction indicates a travelling direction of the swaging. For example, in a case where the aluminum alloy material is the wire and rod material, a longitudinal direction of the wire and rod material (a direction perpendicular to a wire diameter) corresponds to the wire drawing direction. In addition, in a case where the aluminum alloy material is the board, a longitudinal direction in a state where the rolling working is performed corresponds to the rolling direction. Note that, in the case of the board, the board may be cut into a predetermined size after the rolling working, and may be fragmented, and in this case, the longitudinal direction after cutting is not necessarily coincident with the working direction, but even in such a case, the rolling direction can be checked from the worked surface of the board surface.

The aluminum alloy material according to the present invention has the fibrous metal structure in which the crystal grains extend in one direction. Here, a perspective view schematically illustrating the state of the metal structure of the aluminum alloy material according to the present invention is illustrated in FIG. 1. As illustrated in FIG. 1, the aluminum alloy material of the present invention has a fibrous structure in which crystal grains 10 having an elongated shape extend in one direction, and in FIG. 1, the crystal grains 10 extend in a longitudinal direction X. Such crystal grains having an elongated shape are considerably different from fine crystal grains of the related art, or flat crystal grains simply having a large aspect ratio. That is, the crystal grains of the present invention have an elongated shape like a fiber, and an average value of dimensions t of the crystal grains in a direction perpendicular to the longitudinal direction X is 800 nm or less. The fibrous metal structure in which such fine crystal grains extend in one direction can be referred to as a novel metal structure not existing in the aluminum alloy material of the related art.

Further, the primary surface of the aluminum alloy material of the present invention has the crystal orientation distribution in which when K100 is the sum of the diffraction intensities resulting from the crystals in which <100> is oriented in the longitudinal direction, K111 is the sum of the diffraction intensities resulting from the crystals in which <111> is oriented in the longitudinal direction, and H is the ratio (K100/K111) of K100 to K111, the ratio (H) is 0.15 or more as determined by an X-ray pole figure method. Such a texture controlled into a predetermined crystal orientation distribution can be referred to as a novel texture not existing in the primary surface of the aluminum alloy material of the related art.

In the aluminum alloy material of the present invention having the metal structure described above, in which the primary surface has the texture described above, it is possible to make a high strength of greater than 160 MPa to 200 MPa as a tensile strength of A1350 that is aluminum for conduction defined in ASTM (for example, a tensile strength of 220 MPa or more and a Vickers hardness (HV) of 60 or more) and excellent workability (for example, in a case where the aluminum alloy material is a wire rod, in a bending test performed on the basis of JIS Z 2248 (2014), when a bending radius is twice a wire diameter, a crack does not occur) compatible.

In addition, fining a crystal grain size is effect in not only increasing a strength but also in generally increasing the function of the material that is directly linked to a function of improving grain-boundary corrosion, a function of improving fatigue properties with respect to repetitive deformation, a function of reducing surface roughness after plastic working, a function of reducing sag and burr in shearing working, and the like.

(1) Alloy Composition

An alloy composition of the aluminum alloy material of the present invention and the function thereof will be described. The aluminum alloy material of the present invention contains at least one among 0.05 mass % to 1.50 mass % of Fe, 0.01 mass % to 0.15 mass % of Si, 0.01 mass % to 0.3 mass % of Cu, and 0.01 mass % to 1.5 mass % of Mg, as a basic composition, and suitably contains a total of 0.30 mass % or less of one or more selected from the group consisting of RE, Ag, Ni, Mn, Cr, Zr, Ti, and B.

<0.05 mass % to 1.50 mass % of Fe>

Iron (Fe) is an element contributing to the fining of the crystal grains. In a case where the content of Fe is less than 0.05 mass %, such a function effect is insufficient, and in a case where the content of Fe is greater than 1.50 mass %, a crystallized product increases, and thus, the workability decreases. Here, the crystallized product indicates an intermetallic compound that is generated in casting solidification of an alloy. Therefore, the content of Fe is 0.05 mass % to 1.50 mass %, is preferably 0.08 mass % to 0.80 mass %, and is more preferably 0.10 mass % to 0.22 mass %.

<at Least One among 0.01 mass % to 0.15 mass % of Si, 0.01 mass % to 0.3 mass % of Cu, and 0.01 mass % to 1.5 mass % of Mg>

Silicon (Si), copper (Cu), and magnesium (Mg) are an element having a function of stabilizing fine crystal grains of the aluminum base material. By adding two or more types of the elements in combination rather than independently adding the element, the elements effectively function on the fining of the crystal grains. Further, in a state where the crystal grains are fine, the elements have a function of increasing the strength of the material. However, it is not preferable that the content of Si is greater than 0.15 mass %, the content of Cu is greater than 0.3 mass %, and the content of Mg is greater than 1.5 mass %, since a disadvantage that a conductivity decreases is more remarkable than an advantage that the strength increases. A more preferred range in the case of containing Si is 0.10 mass % or less, and is more preferably 0.06 mass % or less. A more preferred range in the case of containing Cu is 0.22 mass % or less, and is more preferably 0.16 mass % or less. A more preferred range in the case of containing Mg is 1.00 mass % or less, and is more preferably 0.30 mass % or less. In addition, such elements synergistically function with a process of the present invention described below, and thus, effectively function in order to control a crystal orientation.

<Total of 0.30 mass % or Less of One or More Selected from Group Consisting of RE, Ag, Ni, Mn, Cr, Zr, Ti, and B>

All of a rare-earth element (RE), silver (Ag), nickel (Ni), manganese (Mn), chromium (Cr), zirconium (Zr), titanium (Ti), and boron (B) have an effect of fining the crystal grains, and thus, are an arbitrarily additive element that can be suitably added as necessary. Such elements synergistically function with the process of the present invention described below, and thus, effectively function in order to control the crystal orientation. Note that, RE indicates a rare-earth element, includes 17 types of elements such as lanthanum, cerium, and yttrium, the 17 types of elements have the same effect, and it is difficult to chemically extract a single element, and thus, in the present invention, RE is defined as a total amount. A total content of such components is 0.0001 mass % or more, and is preferably 0.03 mass % or more, from the viewpoint of obtaining the function effect described above. On the other hand, in a case where the total content of the components is greater than 0.30 mass %, there is a concern that the conductivity decreases. Therefore, in the case of containing one or more selected from the group consisting of RE, Ag, Ni, Mn, Cr, Zr, Ti, and B, the total content thereof is 0.0001 mass % to 0.3 mass %, is preferably 0.03 mass % to 0.30 mass %, and is more preferably 0.03 mass % to 0.23 mass %, and in the case of regarding the conductivity as more important, the total content is 0.03 mass % to 0.15 mass %. Only one type of the components may be independently contained, or two or more types thereof may be contained in combination.

<Balance: Al and Inevitable Impurities>

A balance other than the components described above comprises aluminum (Al) and inevitable impurities. Here, the inevitable impurities indicate impurities at a content level that can be inevitably contained on a manufacturing process. The inevitable impurities can be a factor for decreasing the conductivity in accordance with the content, and thus, it is preferable to suppress the content of the inevitable impurities to some extent, in consideration of a decrease in the conductivity. Examples of a component as the inevitable impurities include bismuth (Bi), lead (Pb), gallium (Ga), strontium (Sr), and the like. Note that, an upper limit of the content of each of the components described above may be 0.03 mass %, and a total amount of the components described above may be 0.10 mass %.

Such an aluminum alloy material can be attained by controlling the alloy composition or the manufacturing process in combination. Hereinafter, a preferred manufacturing method of the aluminum alloy material of the present invention will be described.

(2) Manufacturing Method of Aluminum Alloy Material According to One Example of Present Invention Such an aluminum alloy material according to one example of the present invention has a high strength and high bending properties, in particular, by introducing a crystal grain boundary into an Al—Fe—(Si, Cu, Mg)-based alloy at a high density. That is, the re-arrangement of a lattice defect in the alloy is accelerated and stabilized by incorporating a stabilization heat treatment in a predetermined condition during swaging.

It is preferable that in a preferred manufacturing method of the aluminum alloy material of the present invention, a treatment set of cold working [1] at a working degree of 1.2 or less and a stabilization heat treatment [2] at a treatment temperature of 70° C. to 160° C. for a retention time of 2 hours to 10 hours is set as one set, and in this order, three or more treatment sets are repeatedly performed with respect to the aluminum alloy material having a predetermined alloy composition described above, and a total working degree of the cold working [1] is 3.0 or more. As necessary, temper annealing [3] may be performed as a final step. Hereinafter, the details will be described.

In general, in a case where a deformation stress is applied to a metal material, crystal slip occurs as an elementary step of the deformation of metal crystals. It can be considered that a metal material in which such crystal slip easily occurs has a small stress that is required for deformation and a low strength. For this reason, in order to increase the strength of the metal material, it is important to suppress the crystal slip that occurs in a metal structure. The presence of the crystal grain boundary in the metal structure is considered as a factor of inhibiting such crystal slip, and such a crystal grain boundary is capable of preventing the crystal slip from propagating in the metal structure when a deformation stress is applied to the metal material, and as a result thereof, the strength of the metal material is increased. Further, in this alloy, the crystal grain boundary is less likely to be a factor of decreasing electric conduction, and thus, is suitable to make the strength and the electric conductive properties compatible.

For this reason, in order to increase the strength of the metal material, it is considered as desirable to introduce the crystal grain boundary into the metal structure at a high density. Here, for example, the division of the metal crystals due to the deformation of the metal structure as described below is considered as a forming mechanism of the crystal grain boundary.

In general, in a polycrystalline material, a stress state is a complicated multi-axis state due to a difference between the orientations of the adjacent crystal grains, and a space distribution of distortion between in the vicinity of a surface layer in contact with a working tool and in a bulk. Due to such influences, the crystal grains that are in a single orientation before deformation are divided into a plurality of orientations in accordance with the deformation, and the crystal grain boundary is formed between the divided crystals.

However, in general, in a metal material subjected to swaging, bending workability that is properties opposite to the strength tends to decrease. In particular, in the case of aluminum or an aluminum alloy, the workability is further degraded compared to copper, even in the case of comparing materials having the same degree of elongation.

Bending mainly configures the deformation such as twisting, knitting, weaving, and binding. In a crack that occurs due to bending deformation, the metal crystals are unevenly deformed, and thus, local distortion occurs, concavities and convexities are formed on the surface of the metal material, such concavities and convexities become a stress concentration point, and the deformation is further localized, and thus, the crack occurs. Such uneven deformation is a plastic unstable phenomenon after the metal material reaches a work-hardening limit.

Then, the present inventors have found that the ease of occurrence of such uneven deformation relates to a crystal orientation of the metal material. In general, in a case where a stress of plane distortion deformation including monoaxial deformation such as drawing working or swaging working, rolling working, or the like is applied to a metal material of a face-centered cubic lattice (FCC) metal, a stable orientation according to such deformation is crystal orientation in which a {100} plane or a {111} plane of crystals is oriented in a longitudinal direction LD of the metal material (a drawing direction DD) (LD is parallel to the direction of <100> or the direction of <111>, hereinafter, it is notated as LD//<100> or LD//<111>). Among them, in the crystals oriented in LD//<100>, uneven deformation is unlikely to occur. In contrast, in the crystals oriented in LD//<111>, uneven deformation is likely to occur regardless of which crystal plane is oriented in a surface direction (a normal direction ND). That is, in the ease of occurrence of uneven deformation, which crystal plane is oriented in LD is important.

Figure 2:
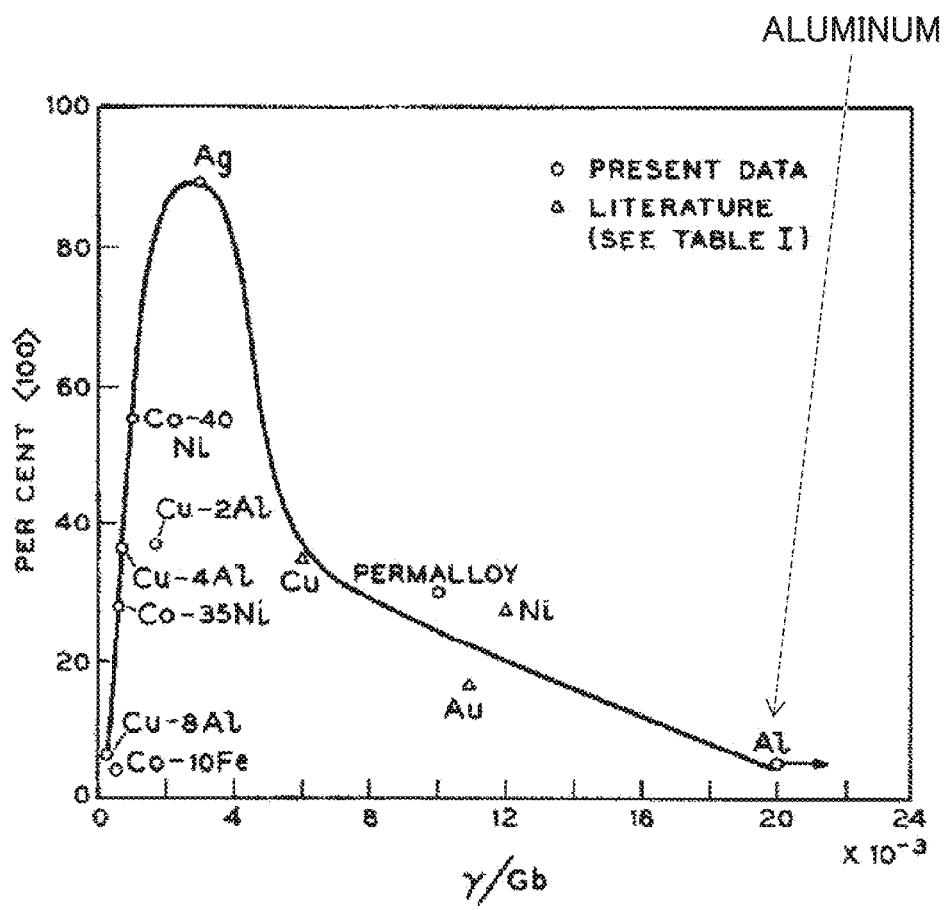
FIG. 2 illustrates study results of A. T. English, and is a graph in which a crystal orientation distribution after cold wire drawing in various metals and alloys having a face-centered cubic lattice structure is organized by stacking-fault energy.

However, it is known that the crystal orientation distribution that occurs by working deformation as described above, in particular, a ratio of the crystals being oriented in LD//<100> or LD//<111> is different in accordance with the type of metal. For example, according to the study of A. T. English in 1965 (cited from A. T. ENGLISH and G. Y. CHIN, "On the variation of wire texture with stacking fault energy in f.c.c. metals and alloys" ACTA METALLURGICA VOL. 13 (1965) p. 1013-1016), a crystal orientation distribution of aluminum in the case of being subjected to wire drawing working at an area reduction rate of 99.97% is greatly different from that of the case of copper and nickel that are also an FCC metal. As illustrated in FIG. 2, in the case of copper and nickel, ratios of crystal orientation of LD//<100> (volume ratios of the crystals) are 34% and 27%, respectively. In contrast, in the case of aluminum, a ratio of crystal orientation of LD//<100> (a volume ratio of crystals) is merely 5%, that is, a crystal orientation distribution is obtained in which crystal orientation of LD//<111> is remarkable. Accordingly, in the case of an aluminum alloy material prepared by a general working method (drawing working, rolling working, or the like), most crystal orientation due to the deformation is the crystal orientation of LD//<111> in which uneven deformation is likely to occur.

As a result of more intensive studies of the present inventors, based on such a finding, it has been found that in the crystal orientation distribution of the primary surface of the aluminum alloy material, (1) the crystal orientation of LD//<111> is a factor of decreasing bending workability of an aluminum alloy material subjected to strong deformation, and (2) in a high-strength material, bending workability can be considerably improved by decreasing the crystal orientation of LD//<111> and by increasing the ratio of the crystal orientation of LD//<100>.

In particular, in the texture of the primary surface of the aluminum alloy material, in a case where the crystals are oriented in LD//<100>, the amount of slip deformation of the crystals decreases, and cross slip remarkably occurs, from a difference in geometric arrangement of a crystal slip system, compared to a case where the crystals are oriented in LD//<111>. According to such two functions, a work-hardening rate in the bending deformation is greatly reduced. The plastic unstable phenomenon is remarkably suppressed, and thus, the occurrence of a crack can be prevented.

A manufacturing method for increasing the crystal orientation of LD//<100> will be described. In the present invention, from the viewpoint of increasing the strength, the cold working [1] is performed such that a final working degree (the total working degree) is 3.0 or more, and from the viewpoint of maintaining and improving the bending workability, a working degree of the cold working [1] per one time of working is 1.2 or less, and the stabilization heat treatment is performed at a treatment temperature of 70° C. to 160° C. for a retention time of 2 hours to 10 hours after the cold working [1]. That is, the treatment set of the cold working [1] at a working degree of 1.2 or less and the stabilization heat treatment [2] at a treatment temperature of 70° C. to 160° C. for a retention time of 2 hours to 10 hours is set as one set, and in this order, three or more treatment sets are repeatedly performed, and the total working degree of the cold working [1] is 3.0 or more. In particular, it is possible to accelerate the division of the metal crystals due to the deformation of the metal structure and to introduce the crystal grain boundary into the aluminum alloy material at a high density, by increasing the total working degree. As a result thereof, the strength of the aluminum alloy material is considerably improved. Such a total working degree is preferably 4.5 or more, is more preferably 6.0 or more, is even more preferably 7.5 or more, and is most preferably 8.5 or more. In addition, an upper limit of the total working degree is not particularly defined, but is generally 15.

Note that, when a cross section area before working is s1, and a cross section area after working is s2 (s1>s2), a working degree η is represented by Expression (1) described below.

$$\text{Working Degree (Non-Dimensional)}: \eta = \ln(s1/s2) \tag{1}$$

In addition, it is preferable that the cold working [1] of one set has a desired working degree of 1.2 or less through a plurality of passes. For example, the cold working is performed for approximately 6 passes to 12 passes by setting an area reduction rate to 10% to 25% per one pass, and thus, it is possible to control the working degree such that a desired working degree of 1.2 or less is obtained. Note that, a lower limit of the working degree of the cold working [1] of one set is not particularly limited, but is preferably 0.6, from the viewpoint of adequately accelerating the division of the metal crystals.

A working method may be suitably selected in accordance with the shape of the aluminum alloy material that is a target (a wire and rod material, a board, a strip, a foil, and the like), and examples of the method include drawing working using a cassette roller die, groove roll rolling, round wire rolling, a die, or the like, swaging, and the like. In any working method, the crystal orientation distribution of the present invention can be obtained by increasing the friction between the tool and the material and by actively introducing additional shearing distortion. In addition, terms and conditions (the type of lubricant oil, a working speed, working heat generation, and the like) in the working as described above may be suitably adjusted in a known range.

The aluminum alloy material is not particularly limited insofar as the aluminum alloy material has the alloy composition described above, and for example, an extrusion material, an ingot material, a hot rolling material, a cold rolling material, and the like can be suitably selected in accordance with the purpose of use.

In addition, in the present invention, the cold working [1] in which the working degree per one time of working is 1.2 or less is performed three or more times, and a predetermined stabilization heat treatment [2] is performed as a set after each cold working [1]. Such a stabilization heat treatment [2] is introduced into a plurality of times of the cold working [1] at a high frequency, and thus, has a function of preventing crystal rotation (orientation) of LD//<111> that occurs in crystal orientation due to general deformation and of accelerating crystal rotation (orientation) of LD//<100>. It is preferable that the treatment temperature of the stabilization heat treatment [2] is 70° C. to 160° C. This is because in a case where the treatment temperature of the stabilization heat treatment [2] is lower than 70° C., it is hard to obtain the function as described above, and in a case where the treatment temperature is higher than 160° C., the density of the crystal grain boundary decreases, and the strength tends to decrease. In addition, it is preferable that the retention time of the stabilization heat treatment [2] is 2 hours to 10 hours. Note that, terms and conditions of such a heat treatment can be suitably adjusted in accordance with the type or amount of inevitable impurities and a solid solution/precipitation state of the aluminum alloy material.

In addition, in the present invention, in order to release a residual stress or improve the elongation, the temper annealing [3] may be performed as the final treatment with respect to the aluminum alloy material. In the case of performing the temper annealing [3], it is preferable that a treatment temperature is 50° C. to 130° C. In a case where the treatment temperature of the temper annealing [3] is lower than 50° C., it is difficult to obtain the effect as described above, and in a case where the treatment temperature is higher than 130° C., the growth of the crystal grains is caused by recovery or recrystallization, and the strength decreases. In addition, a retention time of the temper annealing [3] is preferably 24 hours to 48 hours. Note that, terms and conditions of such a heat treatment can be suitably adjusted in accordance with the type or amount of inevitable impurities and the solid solution/precipitation state of the aluminum alloy material.

In addition, in the present invention, as described above, working having a high working degree is performed with respect to the aluminum alloy material by a method such as drawing or rolling using a die. For this reason, an elongated aluminum alloy material is obtained as a result. On the other hand, in a manufacturing method of an aluminum alloy material of the related art, such as powder sintering, compression twisting working, high pressure torsion (HPT), forging working, and equal channel angular pressing (ECAP), it is difficult to obtain such an elongated aluminum alloy material. Such an aluminum alloy material of the present invention is preferably manufactured at a length of 10 m or more. Note that, an upper limit of the length of the aluminum alloy material at the time of being manufactured is not particularly set, but is preferably 6000 m, in consideration of operability or the like.

In addition, it is effective to increase the working degree in order to make the crystal grains fine, and thus, in a case where the aluminum alloy material of the present invention, as described above, is prepared particularly as a wire and rod material, the configuration of the present invention is easily attained as the diameter decreases, and in a case where the aluminum alloy material of the present invention is prepared as a board or a foil, the configuration of the present invention is easily attained as the thickness decreases.

In particular, in a case where the aluminum alloy material of the present invention is the wire and rod material, a wire diameter thereof is preferably 2 mm or less, is more preferably 1 mm or less, is even more preferably 0.4 mm or less, and is particularly preferably 0.2 mm or less. Note that, a lower limit is not particularly set, but is preferably 0.01 mm, in consideration of the operability or the like. One of the advantages of an aluminum alloy wire and rod material of the present invention is that the aluminum alloy wire and rod material has a high strength even in a state of a fine wire, and thus, can be used as a thin single wire.

In addition, in a case where the aluminum alloy material of the present invention is the board, a board thickness thereof is preferably 2 mm or less, is more preferably 1 mm or less, is even more preferably 0.4 mm or less, and is particularly preferably 0.2 mm or less. Note that, a lower limit is not particularly set, but is preferably 0.01 mm. One of the advantages of an aluminum alloy board of the present invention is that the aluminum alloy board has a high strength even in the shape of a thin board or foil, and thus, can be used as a thin single layer.

In addition, as described above, the aluminum alloy material of the present invention is worked to be thin, and a plurality of aluminum alloy materials are prepared and joined to be thick, and thus, can also be used in an intended application. Note that, a known method can be used as a joining method, and examples of the method include pressure welding, welding, joining using an adhesive agent, friction stirring and joining, and the like. In addition, in a case where the aluminum alloy material is the wire and rod material, a plurality of aluminum alloy materials are bundled and twisted, and thus, can also be used in an intended application, as an aluminum alloy twisted wire. Note that, a step of the temper annealing [3] described above may be performed after the aluminum alloy material subjected to the cold working [1] described above is worked by joining or twisting.

(3) Structural Characteristics of Aluminum Alloy Material of Present Invention

<Metal Structure>

In the aluminum alloy material of the present invention that is manufactured by the manufacturing method as described above, the crystal grain boundary is introduced into the metal structure at a high density. Such an aluminum alloy material of the present invention has the fibrous metal structure in which the crystal grains extend in one direction, and in the cross section parallel to the one direction described above, the average value of the dimensions of the crystal grains described above in the direction perpendicular to the longitudinal direction is 800 nm or less. Such an aluminum alloy material has a unique metal structure that does not exist in the related art, and thus, is capable of exhibiting a particularly excellent strength.

The metal structure of the aluminum alloy material of the present invention is a fibrous structure, in which the crystal grains in an elongated shape extend in one direction into a fibrous shape. Here, the "one direction" corresponds to the working direction (the drawing direction) of the aluminum alloy material, and in a case where the aluminum alloy material is the wire and rod material, the "one direction", for example, corresponds to a wire drawing direction, and in a case where the aluminum alloy material is the board or the foil, the "one direction", for example, corresponds to the rolling direction. In addition, the aluminum alloy material of the present invention, in particular, exhibits particularly excellent strength properties with respect to a tensile stress in a direction parallel to the working direction.

In addition, the one direction described above preferably corresponds to the longitudinal direction of the aluminum alloy material. That is, in a general aluminum alloy material, the drawing direction DD corresponds to the longitudinal direction LD unless the aluminum alloy material is diced into a dimension shorter than a dimension in a direction perpendicular to the working direction.

In addition, in the cross section parallel to the one direction described above, the average value of the dimensions of the crystal grains in the direction perpendicular to the longitudinal direction is 800 nm or less, is more preferably 600 nm or less, is further preferably 400 nm or less, is particularly preferably 200 nm or less, and is even more preferably 100 nm or less. In the fibrous metal structure in which the crystal grains having a small diameter (the dimension of the crystal grains in the direction perpendicular to the longitudinal direction) extend in one direction, the crystal grain boundary is formed at a high density, and according to such a metal structure, the crystal slip due to the deformation can be effectively inhibited, and a high strength that is not attained in the related art can be attained. In addition, there is a function that uneven deformation due to the bending deformation is suppressed by the effect of fine crystal grains. Note that, it is preferable that the average value of the dimensions of the crystal grains in the direction perpendicular to the longitudinal direction is small from the viewpoint of attaining a high strength, and a lower limit thereof as a manufactural or physical limit, for example, is 50 nm.

In addition, the dimension of the crystal grains in the longitudinal direction is not necessarily specified, but is preferably 1200 nm or more, is more preferably 1700 nm or more, and is even more preferably 2200 nm or more. In addition, an aspect ratio of the crystal grains described above is preferably 10 or more, and is more preferably 20 or more.

<Texture>

In addition, the primary surface of the aluminum alloy material of the present invention that is manufactured by the manufacturing method as described above has a texture in which the crystal orientation distribution is controlled such that the crystal orientation of LD//<111> is suppressed, and the crystal orientation of LD//<100> increases. Such a primary surface of the aluminum alloy material of the present invention has the crystal orientation distribution in which the ratio H (=K100/K111) of K100 that is the sum of the diffraction intensities resulting from the crystals in which <100> is oriented in the longitudinal direction of the crystal grains to K111 that is the sum of the diffraction intensities resulting from the crystals in which <111> is oriented in the longitudinal direction is 0.15 or more as determined by an X-ray pole figure method. Such a primary surface of the aluminum alloy material has a unique texture that does not exist in the related art, and thus, is capable of exhibiting particularly excellent bending workability.

Figure 3:
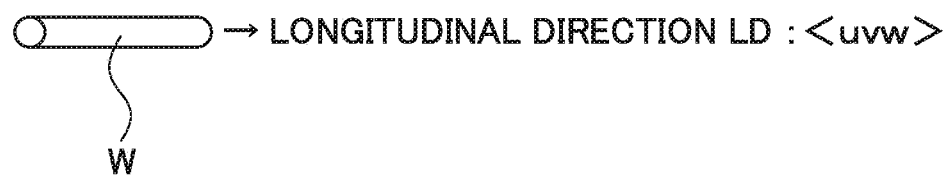
FIG. 3 is a diagram illustrating a notation method of a longitudinal direction and a sample surface direction, and directions of crystal orientation therein, by using a wire rod as an example.
Figure 4:
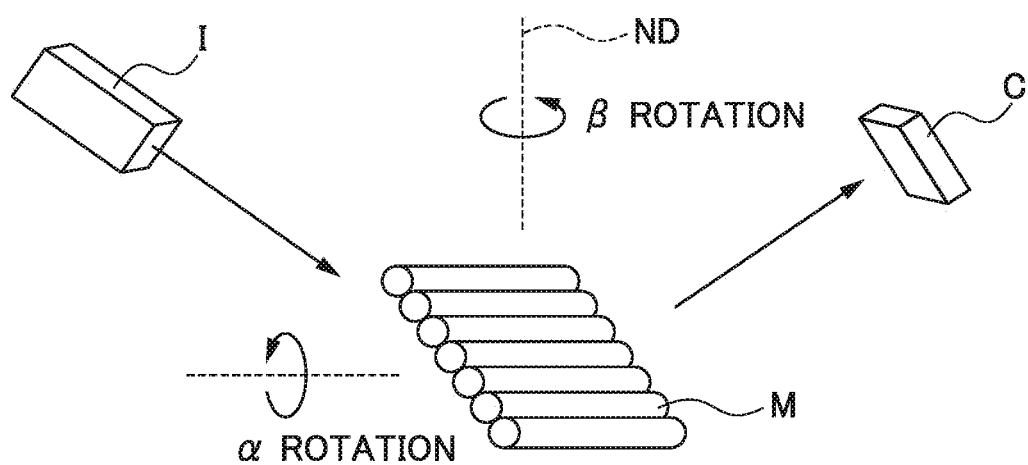
FIG. 4 is a diagram for illustrating a method of measuring a crystal orientation distribution of a surface of an aluminum alloy material with an X-ray pole figure method, by using a wire rod as an example.
Figure 5:
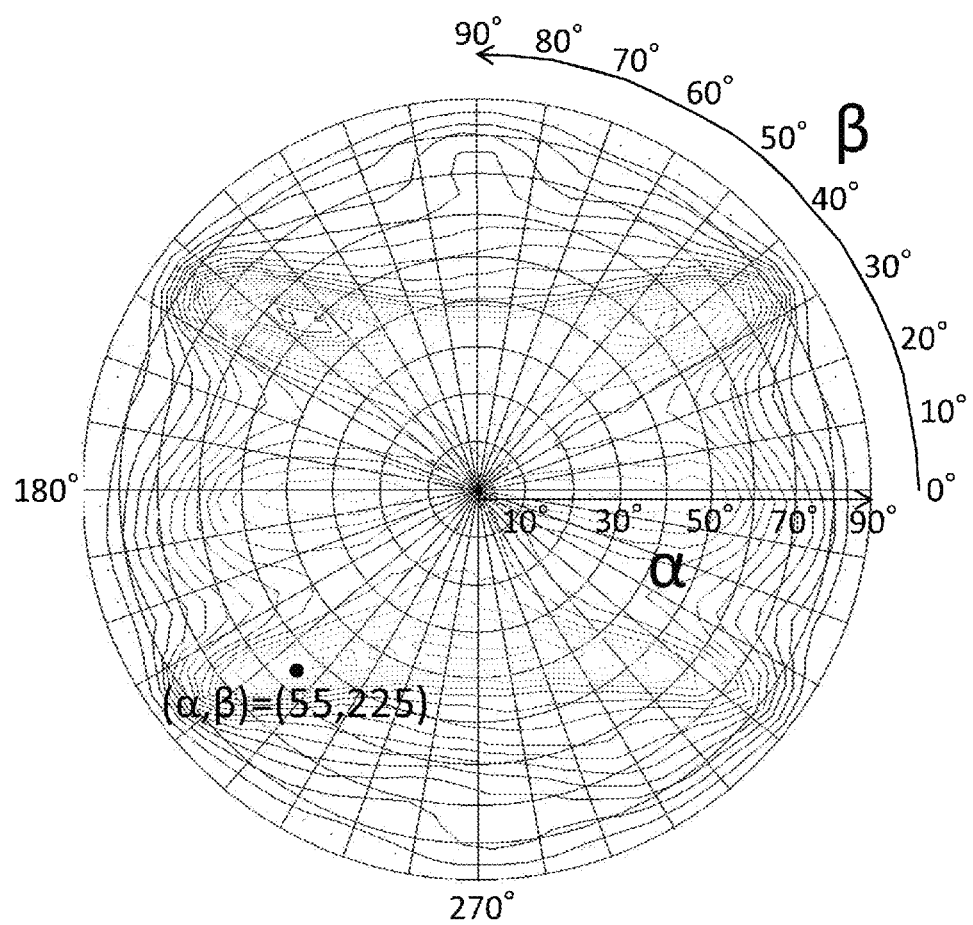
FIG. 5 is a diagram illustrating setting of axes of angles α and β in a pole figure.
Figure 6:
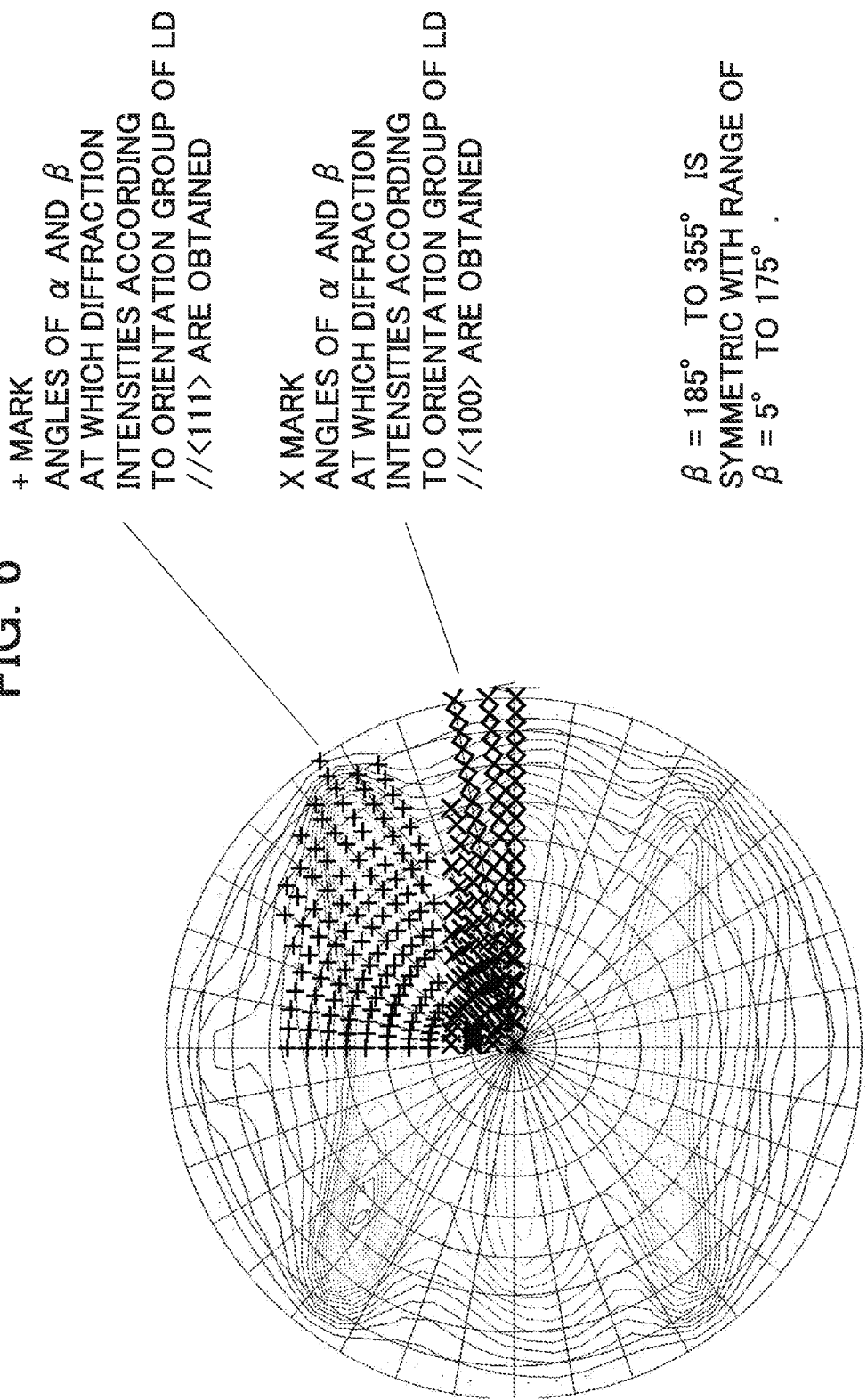
FIG. 6 is a diagram illustrating a combination of angles of α and β at which diffraction intensities according to a crystal orientation group of LD//<111> are obtained as a + mark, and similarly, a combination of angles of α and β at which diffraction intensities according to a crystal orientation group of LD//<100> are obtained as a X mark, in a pole figure, and illustrates the + mark and the X mark only in a case where β is in a range of 0° to 90° (the first octant).
Figure 7:
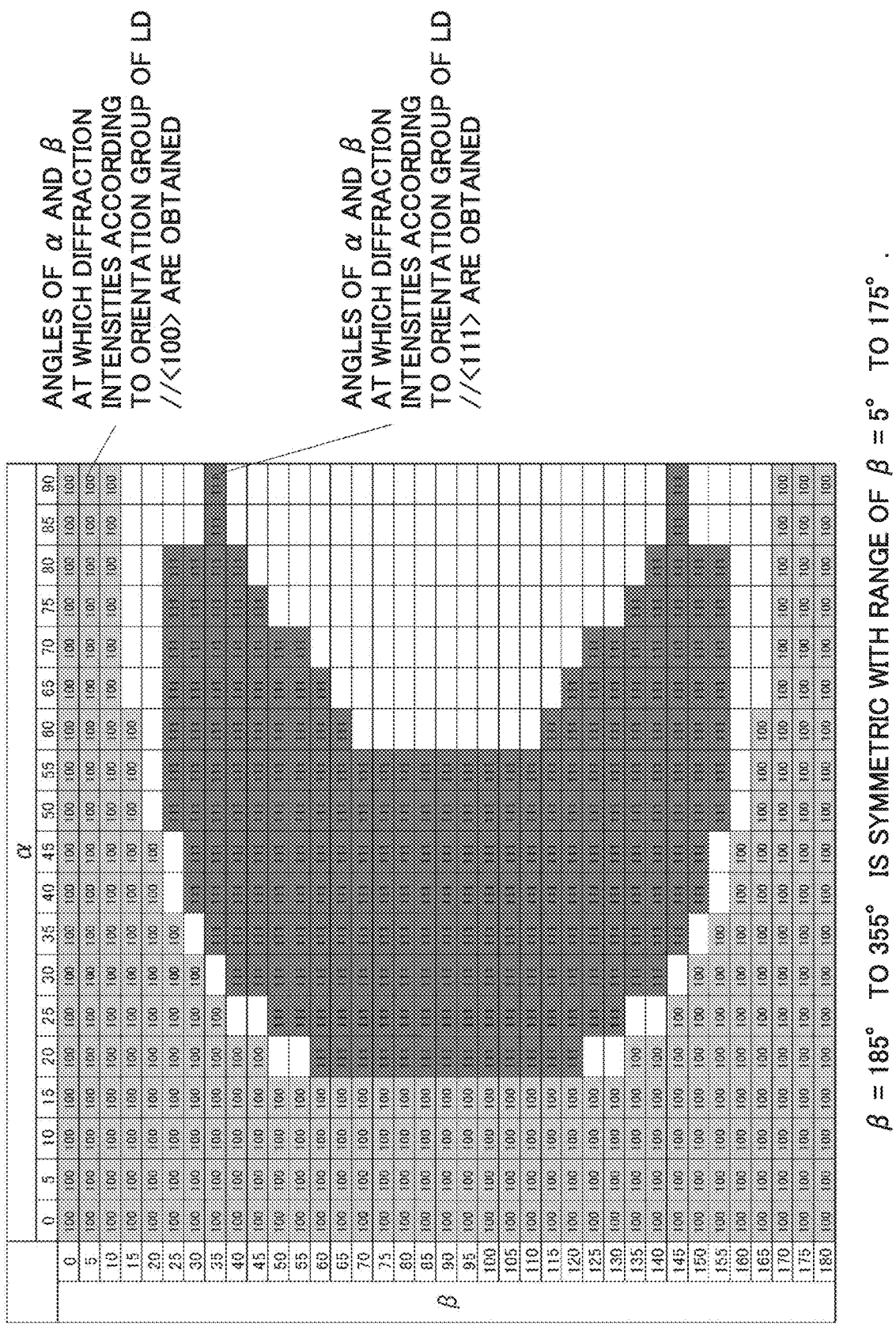
FIG. 7 illustrates an angle at which K100 and K111 are obtained, in a table in which angles of α and β are set to two axes.

As illustrated in FIG. 3, in the crystal orientation in the material, a crystal plane in the surface direction (the normal direction (ND)) is represented by {hkl}, and the orientation in the longitudinal direction (LD) is represented by <uvw>. The crystal orientation distribution is measured on the basis of a (200) X-ray pole figure. A reflection method of Schulz was adopted, and an X-ray source and a detector were fixed such that 44.72° that is a Bragg diffraction angle of a {001} plane was satisfied. A measurement system is illustrated in FIG. 4. A CuKα ray was used in the X-ray source. Then, as illustrated in FIG. 4, a diffraction X-ray strength according to α rotation and β rotation of the sample surface to be measured was measured at every 5°. The α rotation is rotation that inclines a normal line of the sample surface and is in a range of 0° to 85°, and the β rotation is rotation around the normal line of the sample surface and is in a range of 0° to 355°. The sample was prepared by arranging and pasting a plurality of wire rods that are cut into a length of 25 mm on a glass plate to cover the glass plate. A total width after the wire rods are arranged was set to be 20 mm to 30 mm. The diffraction X-ray strength that is measured is referred to as a pole figure. Rotation angles of α and β are displayed in parentheses as with (α, β), respectively. The center of a circle is (0, 0), and the direction of 3 o'clock is (90, 0). A display method of the pole figure is illustrated in FIG. 5. On the pole figure, diffraction intensities of a crystal orientation group of LD//<111> is detected by the combination of α and β that is represented by a + mark in FIG. 6. In addition, diffraction intensities of a crystal orientation group of LD//<100> is detected by the combination of α and β that is represented by a X mark in FIG. 6. A table in which the angles of α and β are set to two axes is illustrated in FIG. 7. A sum of the diffraction intensities of the crystal orientation group of LD//<111> was K111, and a sum of the diffraction intensities of the crystal orientation group of LD//<100> was K100. Then, the ratio H (=K100/K111) thereof was calculated. A peak intensity ratio H (K100/K111) increases as the crystal orientation group of LD//<100> increases and the crystal orientation group of LD//<111> decreases. Then, in the aluminum alloy material of the present invention, it is necessary that H is 0.15 or more, and H is more preferably 0.30 or more, and is even more preferably 0.45 or more. An upper limit of H is not particularly limited, but is 6 or less.

As described above, in the primary surface, the crystal orientation of LD//<111> is the factor of decreasing the bending workability of the aluminum alloy material subjected to strong deformation. Therefore, in the texture of the primary surface, it is preferable to decrease the crystal orientation of LD//<111> and to increase the ratio of the crystal orientation of LD//<100>, from the viewpoint of improving the bending workability.

(4) Properties of Aluminum Alloy Material of Present Invention

[Tensile Strength]

The tensile strength is a value that is measured on the basis of JIS Z2241:2011. The detailed measurement condition will be described in the section of Examples described below. In particular, in a case where the aluminum alloy material of the present invention is the wire and rod material, a preferred tensile strength is 220 MPa or more. Such a tensile strength is greater than 160 MPa to 200 MPa that is a tensile strength of aluminum A1350 for conduction shown in ASTM INTERNATIONAL by 10% or more. (Standard Name: B230/B230M-07). Accordingly, for example, in a case where the aluminum alloy wire and rod material of the present invention is applied to a cable, there is an effect of reducing the cross section area and the weight of a conductor of the cable by 10% while maintaining a high tensile force of the cable. In addition, a preferred tensile strength of the present invention is 260 MPa or more, and a more preferred tensile strength is 300 MPa or more. Further, an even more preferred tensile strength is 340 MPa or more. Such a tensile strength is greater than 305 MPa to 330 MPa that is a tensile strength of a 6000-based aluminum alloy A6201 shown in ASTM INTERNATIONAL. (Standard Name: B398/B398M-14). The most preferred tensile strength is 380 MPa or more.

[Vickers Hardness (HV)]

The Vickers hardness (HV) is a value that is measured on the basis of JIS Z2244:2009. The detailed measurement condition will be described in the section of Examples described below. Note that, in the case of measuring a Vickers hardness (HV) of a product that has been already a part, the product is disassembled, and a cross section is subjected to mirror polishing, and thus, the cross section can also be measured. In particular, in a case where the aluminum alloy material of the present invention is the wire and rod material, the Vickers hardness HV is preferably 60 or more. Such HV is greater than 54 that is HV of aluminum A1350 for conduction shown in ASTM INTERNATIONAL by 10% or more. Accordingly, for example, in a case where the aluminum alloy wire and rod material of the present invention is applied to a cable, there is an effect of reducing the cross section area and the weight of a conductor of the cable by 10% while maintaining a high tensile force of the cable. In addition, preferred HV of the present invention is 70 or more, and more preferred HV is 80 or more. Even more preferred HV is 90 or more. Such a tensile strength is greater than 85 that is tensile strength of a 6000-based aluminum alloy A6201 shown ASTM INTERNATIONAL. The most preferred HV is 100 or more. Note that, an upper limit of the Vickers hardness (HV) of the aluminum alloy material of the present invention is not particularly limited, but for example, is 250.

[Bending Workability]

An index of the workability or the formability of twisting, knitting, weaving, binding, and the like, as described at the beginning, was evaluated by W bending, on the basis of JIS Z 2248 (2014). In a case where the bending was performed at a radius twice the wire diameter, and a crack or disconnection occurred on the sample surface, the workability was not determined as excellent and was represented by a X mark in the table. In a case where the bending was capable of being performed without such a fault, the bending workability was excellent and was represented by a ○1 mark. In a case where the bending was capable of being performed at the same radius as the wire diameter, the bending workability was more excellent and was represented by a ○2 mark, and in a case where the bending was capable of being performed at a radius of half the wire diameter, the bending workability was most excellent and was represented by a ○3 mark.

[Conductivity]

A preferred conductivity is different in accordance with an application or a strength band. In a strength band in which a tensile strength is 220 MPa to 340 MPa, conduction is a basic function, and thus, it is preferable that the conductivity is 55% IACS or more. It is more preferable that the conductivity is 57% IACS or more. On the other hand, in a strength band in which a tensile strength is 340 MPa or more, mechanical properties are a basic function, and thus, it is preferable that the conductivity is 45% IACS or more. It is more preferable that the conductivity is 48% IACS or more.

[Metal Covering]

The aluminum alloy material of the present invention is a bare material, that is, sufficiently has properties such as a tensile strength, a Vickers hardness, bending workability, and conductivity by itself. In addition, the aluminum alloy material of the present invention is not only used as the bare material, but also has excellent joining properties in the case of being covered with other metals by a method such as plating or clad, and exhibits an effect of making excellent strength, excellent bending workability, and excellent electric conductive properties compatible as with the case of the bare material. The type of metal for covering includes Cu, Ni, Ag, Pd, Au, Sn, and the like. There is an effect of reducing contact resistance, of improving corrosion resistance, or the like. A coverage is preferably approximately 25% of the entire area, in the cross section perpendicular to the longitudinal direction. This is because in a case where the coverage is excessively large, an effect of decreasing weight is reduced. The coverage is preferably 15% or less, is more preferably 10% or less, and is even more preferably 5% or less. In the case of measuring the crystal orientation by the X-ray pole figure method, the metal for covering is dissolved with an acid such that the surface of the aluminum alloy is exposed, and then, the crystal orientation is measured as with a bare aluminum alloy. In a case where the plastic working is performed after the aluminum alloy material is covered with a metal, the metal for covering reacts with the aluminum alloy that is the base material by working heat generation, and thus, an intermetallic compound may be formed. Accordingly, for example, a method such as decreasing a wire drawing working speed to a 50 m/min or less or increasing the ability of cooling a workpiece by forcibly cooling an antifriction is required.

(5) Application of Aluminum Alloy Material of Present Invention

The aluminum alloy material of the present invention can be used in all applications in which an iron-based material, a copper-based material, and an aluminum-based material are used. Specifically, the aluminum alloy material can be preferably used as a conductive member such as an electric wire or a cable, a battery member such as a mesh or a net for a current collector, a fastening part such as a screw, a bolt, or a rivet, a spring part such as a coil spring, a spring member for electric contact such as a connector or a terminal, a structural part such as a shaft or a frame, a guide wire, a bonding wire for a semiconductor, a winding wire used in a power generator or a motor, and the like. More specific application examples of the conductive member include a power wire such as an overhead transmission electric wire, OPGW, an underground electric wire, and an underwater cable, an electric wire for communication such as a telephone cable or a coaxial cable, an electric wire for a device such as a wired drone cable, a cabtire cable, an EV/HEV charging cable, a twisted cable for offshore wind power generation, an elevator cable, an umbilical cable, a robot cable, a train cable, or a trolley wire, an electric wire for transportation such as an automobile wire harness, a marine electric wire, or an airplane electric wire, a bus bar, a lead frame, a flexible flat cable, a conductor rod, an antenna, a connector, a terminal, a cable braid, a cleaner cable, a conductor for a wearable device, and the like. In a case where the electric wire or the cable is used as a twisted wire, the twisted wire may be obtained by mixing the aluminum alloy of the present invention with a versatile conductor such as copper or aluminum. Examples of the battery member include an electrode of a solar battery, an electrode of a lithium ion battery, and the like. More specific application examples of the structural part (member) include a scaffold in a construction site, a conveyor mesh belt, a metal fiber for clothing, a chain mail, a fence, an insect repellent net, a zipper, a fastener, a clip, aluminum wool, a bicycle part such as a brake wire or a spoke, a reinforcement wire for reinforced glass, a pipe seal, metal packing, a protection reinforcement material for a cable, a core metal for a fan belt, a wire for driving an actuator, a chain, a hanger, a mesh for soundproofing, a shelf, a strength reinforcement wire for a high-pressure tank such as a hydrogen tank, a tension member for a cable, a mesh for screen printing, and the like. More specific application examples of the fastening part (member) include a set screw, a staple, a pushpin, and the like. More specific application examples of the spring part (member) include a spring electrode, a terminal, a connector, a spring for a semiconductor probe, a plate spring, a power spring, and the like. In addition, the aluminum alloy material is also preferable as a resin-based material, a plastic material, and a metal fiber that is added in order to impart electric conductive properties to cloth or the like or to control a strength or an elastic modulus. In addition, the aluminum alloy material is also preferable as a consumer member or a medical member such as an eyeglass frame, a watch belt, a pen point of a fountain pen, a fork, a helmet, or an injection needle. In any application, the aluminum alloy material according to the present invention may be used by being suitably combined or mixed with another material.

As described above, the embodiment of the present invention has been described, but the present invention is not limited to the embodiment described above, and includes all aspects included in the concept and the claims of the present invention, and can be variously modified within the scope of the present invention.

EXAMPLES

Next, in order to further clarify the effects of the present invention, examples of the present invention and comparative examples will be described, but the present invention is not limited to the examples.

Examples 1 to 33 of Present Invention

First, each rod material of 10 mm$\phi$, having an alloy composition shown in Table 1, was prepared. Next, each aluminum alloy wire rod (0.21 mm$\phi$ to 1.93 mm$\phi$) was prepared by using each of the rod materials, in a manufacturing condition shown in Table 1.

Note that, manufacturing conditions A to F shown in Table 1 are specifically as follows.

<Manufacturing Condition A>

A total of three sets of a combination of wire drawing working having a working degree of 1.1 and a stabilization heat treatment retained at 100° C. for 5 hours were performed. Note that, the temper annealing [3] was not performed.

<Manufacturing Condition B>

A total of five sets of a combination of wire drawing working having a working degree of 1.1 and a stabilization heat treatment retained at 100° C. for 5 hours were performed. Note that, the temper annealing [3] was not performed.

<Manufacturing Condition C>

A total of seven sets of a combination of wire drawing working having a working degree of 1.1 and a stabilization heat treatment retained at 100° C. for 5 hours were performed. Note that, the temper annealing [3] was not performed.

<Manufacturing Condition D>

The temper annealing [3] was performed in a condition of a treatment temperature of 100° C. and a retention time of 36 hours, after the manufacturing condition A.

<Manufacturing Condition E>

The temper annealing [3] was performed in a condition of a treatment temperature of 100° C. and a retention time of 36 hours, after the manufacturing condition B.

<Manufacturing Condition F>

The temper annealing [3] was performed in a condition of a treatment temperature of 100° C. and a retention time of 36 hours, after the manufacturing condition C.

Comparative Example 1

In Comparative Example 1, an aluminum wire rod (0.24 mm$\phi$) was prepared by using a rod material of 10 mm$\phi$, containing 99.99 mass %-Al, in a manufacturing condition shown in Table 1.

Comparative Examples 2 to 6

In Comparative Examples 2 to 4, each aluminum alloy wire rod (0.07 mm$\phi$ to 2.0 mm$\phi$) was prepared by using each rod material of 10 mm$\phi$, having an alloy composition shown in Table 1, in a manufacturing condition shown in Table 1.

Comparative Examples 7, 10

<Manufacturing Condition H>

A total of two sets of a combination of wire drawing working having a working degree of 1.1 and a stabilization heat treatment retained at 100° C. for 5 hours were performed. Note that, the temper annealing [3] was not performed.

Comparative Examples 8, 11

<Manufacturing Condition I>

The stabilization heat treatment in the manufacturing condition B was not performed, and wire drawing working having a total working degree of 7.7 was performed. Note that, the temper annealing [3] was not performed.

Comparative Examples 9, 12

<Manufacturing Condition J>

The stabilization heat treatment in the manufacturing condition B was performed at 200° C. for 5 hours.

Comparative Example 13

<Manufacturing Method K>

Aluminum having a purity of 99.95 mass %, magnesium having a purity of 99.95 mass %, silicon having a purity of 99.99 mass %, iron having a purity of 99.95 mass %, and each predetermined amount of Ti and B were put in a graphite crucible, and were stirred and melted at 720° C. by high-frequency induction heating, and thus, a molten metal having an alloy composition of Al-0.06Si-0.24Fe-0.21Cu-0.11Mg (mass %) was manufactured, and was moved to a container provided with a graphite die, and a wire of 10 mmϕ, having a length of 100 mm, was continuously cast at a casting speed of approximately 300 mm/minute through the graphite die subjected to water cooling. Then, cumulative equivalent distortion of 4.0 was introduced by an ECAP method. In this stage, a recrystallization temperature was 300° C. Then, in an inert gas atmosphere, pre-heating was performed at 250° C. for 2 hours. Next, a first wire drawing treatment having a working rate of 29% (a working degree of 0.34) was performed. In this stage, a recrystallization temperature was 300° C. Then, in an inert gas atmosphere, a primary heat treatment was performed at 260° C. for 2 hours. After that, the wire passed through a wire drawing die subjected to water cooling at a drawing speed of 500 mm/minute, and thus, a second wire drawing treatment having a working degree of 9.3 was performed. In this stage, a recrystallization temperature was 280° C. Then, in an inert gas atmosphere, a secondary heat treatment was performed at 220° C. for 1 hour, and thus, an aluminum alloy wire rod (0.08 mmϕ) was obtained. The wire drawing was performed in a condition in which a die half-angle was 5°, and a working rate per one pass was 16%.

[Evaluation]

The following property evaluation was performed by using the aluminum-based wire rods according to the examples and the comparative examples described above. An evaluation condition of each of the properties is as follows. Results are shown in Table 1.

[1] Alloy Composition

An alloy composition was measured by an emission spectroscopic analysis method, on the basis of JIS H1305:2005. Note that, the measurement was performed by using an emission spectroscopic analysis device (manufactured by Hitachi High-Tech Science Corporation).

[2] Structure Observation

Figure 8:
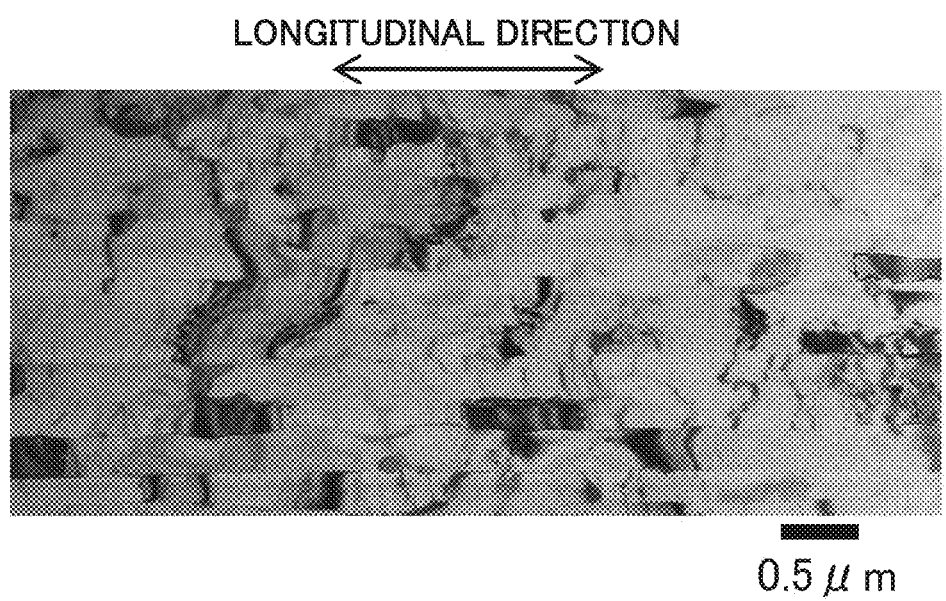
FIG. 8 is a TEM image illustrating a state of a metal structure, in a cross section parallel to a longitudinal direction LD of an aluminum alloy wire rod of Example 28 of the present invention.

A metal structure was observed by using a transmission electron microscope (JEM-2100PLUS, manufactured by JEOL Ltd.), in accordance with transmission electron microscopy (TEM) observation. The observation was performed at an acceleration voltage of 200 kV. As an observation sample, a cross section parallel to a longitudinal direction of the wire rod (the wire drawing direction X) was cut into a thickness of 100 nm±20 nm by a focused ion beam (FIB), and was finished with ion milling. In the TEM observation, a difference in the contrast was recognized as the crystal orientation and a boundary in which the contrast was discontinuous different was recognized as the crystal grain boundary, by using gray contrast. Note that, even in a case where the crystal orientation is different, there may be no difference in the gray contrast in accordance with a diffraction condition of an electron beam, and thus, in such a case, an observation plane was photographed in a plurality of diffraction conditions while changing an angle between the electron beam and the sample by inclining by ±3° with two orthogonal sample rotation axes in a sample stage of an electron microscope, and the grain boundary was recognized. Note that, an observation visual field was (15 to 40) μm×(15 to 40) μm, and in the cross section described above, the observation was performed at a position in the vicinity of the middle between the center and a surface layer (a position on the center side of approximately ¼ of the wire diameter from the surface layer side), on a line corresponding to a wire diameter direction (a direction perpendicular to the longitudinal direction). The observation visual field was suitably adjusted in accordance with the size of the crystal grains. Then, in the cross section parallel to the longitudinal direction of the wire rod (the wire drawing direction X), the presence or absence of a fibrous metal structure was determined from an image that was photographed in the TEM observation. FIG. 8 is a part of a TEM image of the cross section parallel to the longitudinal direction of the wire rod of Example 28 of the present invention (the wire drawing direction X), that was photographed in the TEM observation. In this example, in a case where a metal structure as illustrated in FIG. 8 was observed, the fibrous metal structure was evaluated as "Present". Further, in each of the observation visual fields, arbitrary 100 grains were selected from the crystal grains, the dimension of each of the crystal grains in a direction perpendicular to the longitudinal direction and the dimension of each of the crystal grains in a direction parallel to the longitudinal direction were measured, and an aspect ratio of the crystal grains was calculated. Further, in the dimension of the crystal grains in the direction perpendicular to the longitudinal direction and the aspect ratio, an average value was calculated from the total number of observed crystal grains. Note that, in a case where the observed crystal grains were obviously larger than 400 nm, the number of selected crystal grains to be measured for each dimension was reduced and each average value thereof was calculated. In addition, in a case where the dimension of the crystal grains in the direction parallel to the longitudinal direction was obviously 10 times or more the dimension of the crystal grains in the direction perpendicular to the longitudinal direction, the aspect ratio was determined to be uniformly 10 or more.

[3] Measurement of Crystal Orientation Distribution (X-Ray Pole Figure)

As illustrated in FIG. 4, a glass plate was covered with the wire rod, and was set to a sample for X-ray measurement. Then, a (200) X-ray pole figure was measured in a condition of $2\theta=44.72°$. A sum of diffraction intensities of a crystal orientation group of LD//<111> was K111, and a sum of diffraction intensities of a crystal orientation group of LD//<100> was K100. Then, the ratio H (=K100/K111) thereof was calculated.

[4] Tensile Strength

A tensile test was performed by using a precision universal testing machine (manufactured by Shimadzu Corporation), on the basis of JIS Z2241:2001, and a tensile strength (MPa) was measured. Note that, the test described above was performed in a condition in which a distance between grades was 100 mm and a deformation speed was 10 mm/minute. In this example, in the wire rod before heating, a tensile strength of 220 MPa or more was an acceptable level.

[5] Vickers Hardness (HV)

A Vickers hardness (HV) was measured by using a fine hardness testing machine HM-125 (manufactured by Akashi Co., Ltd. (currently, Mitutoyo Corporation)), on the basis of JIS Z 2244:2009. At this time, a test force was 0.1 kgf and a retention time was 15 seconds. In addition, in the cross section parallel to the longitudinal direction of the wire rod, a measurement position was the position in the vicinity of the middle between the center and the surface layer (the position on the center side of approximately ¼ of the wire diameter from the surface layer side), on the line corresponding to the wire diameter direction (the direction perpendicular to the longitudinal direction), and an average value of measurement values (N=5) was set to the Vickers hardness (HV) of each of the wire rods. Note that, in a case where a difference between a maximum value and a minimum value of the measurement value is 10 or more, the number of measurements was further increased, and an average value of the measurement values (N=10) was set to the Vickers hardness (HV) of each of the wire rods. It is preferable that the Vickers hardness (HV) is large, and in this example, a Vickers hardness (HV) of 60 or more was an acceptable level.

[6] W Bending Workability

The index of the workability or the formability of twisting, knitting, weaving, binding, and the like, as described at the beginning, was evaluated by the W bending, on the basis of JIS Z 2248 (2014). Unlike L bending in which only one portion is bent, in a W bending test, bending is performed while being pulled, and thus, the W bending is more severe evaluation than the L bending. In a case where the bending was performed at a radius twice the wire diameter, and a crack or disconnection occurred on the sample surface, the workability was not determined as excellent, and was represented by a X mark in the table. In a case where the bending was capable of being performed without such a fault, the bending workability was excellent and was represented by a ◯1 mark. In a case where the bending was capable of being performed at the same radius as the wire diameter, the bending workability was more excellent and was represented by a ◯2 mark, and in a case where the bending was capable of being performed at a radius of half the wire diameter, the bending workability was most excellent and was represented by a ◯3 mark.

[7] Conductivity

A conductivity was measured at 20±1° C. by a four-terminal method. In this example, in a strength band in which a tensile strength was 220 MPa to 340 MPa, the conduction was a basic function, and thus, a conductivity of 55% IACS or more was an acceptable level. In addition, in a strength band in which a tensile strength was 340 MPa or more, mechanical properties were a basic function, and thus, a conductivity of 45% IACS or more was an acceptable level. Note that, a thermal conductivity was proportional to the conductivity, and thus, the determination of excellent or poor was substituted by the evaluation of the conductivity.

TABLE 1

| | | Alloy composition [Mass %] | | | | | | | |
|---|---|---|---|---|---|---|---|---|---|
| | | | | | | One or more selected from RE, Ag, Ni, Mn, Cr, Zr, Ti, and B | | | Al and |
| | | Fe | Si | Cu | Mg | Component 1 | Component 2 | Total content | inevitable impurities |
| Example of present invention | 1 | 0.78 | 0.06 | 0.15 | 0.03 | — | — | — | Remainder |
| | 2 | 0.32 | 0.08 | 0.28 | 0.03 | — | — | — | Remainder |
| | 3 | 0.18 | 0.08 | 0.28 | 0.03 | — | — | — | Remainder |
| | 4 | 0.63 | 0.04 | 0.03 | 0.21 | — | — | — | Remainder |
| | 5 | 0.18 | 0.04 | 0.03 | 0.21 | — | — | — | Remainder |
| | 6 | 0.44 | 0.12 | 0.08 | 0.01 | — | — | — | Remainder |
| | 7 | 0.45 | 0.08 | 0.00 | 0.00 | — | — | — | Remainder |
| | 8 | 0.21 | 0.08 | 0.01 | 0.01 | — | — | — | Remainder |
| | 9 | 0.18 | 0.02 | 0.01 | 0.01 | — | — | — | Remainder |
| | 10 | 0.28 | 0.07 | 0.03 | 0.11 | — | — | — | Remainder |
| | 11 | 0.24 | 0.06 | 0.21 | 0.11 | — | — | — | Remainder |
| | 12 | 0.18 | 0.12 | 0.01 | 1.42 | — | — | — | Remainder |
| | 13 | 0.18 | 0.02 | 0.01 | 0.75 | — | — | — | Remainder |
| | 14 | 0.18 | 0.02 | 0.01 | 0.42 | — | — | — | Remainder |
| | 15 | 1.22 | 0.06 | 0.12 | 0.07 | RE = 0.05 | — | 0.05 | Remainder |
| | 16 | 1.22 | 0.06 | 0.26 | 0.18 | RE = 0.05 | — | 0.05 | Remainder |
| | 17 | 1.22 | 0.06 | 0.18 | 0.11 | Ag = 0.11 | — | 0.11 | Remainder |
| | 18 | 1.22 | 0.06 | 0.18 | 0.11 | Zr = 0.14 | — | 0.14 | Remainder |
| | 19 | 0.32 | 0.00 | 0.08 | 0.00 | Ti + B = 0.04 | — | 0.04 | Remainder |
| | 19 | 0.32 | 0.08 | 0.28 | 0.03 | Ti + B = 0.04 | Zr = 0.06 | 0.10 | Remainder |
| | 20 | 0.32 | 0.08 | 0.28 | 0.03 | Ti + B = 0.04 | Mn = 0.24 | 0.28 | Remainder |
| | 21 | 0.18 | 0.08 | 0.28 | 0.03 | Ti + B = 0.04 | Cr = 0.08 | 0.12 | Remainder |
| | 22 | 0.18 | 0.08 | 0.28 | 0.03 | Ti + B = 0.04 | Zr = 0.18 | 0.22 | Remainder |
| | 23 | 0.45 | 0.08 | 0.01 | 0.01 | Ti + B = 0.04 | Ni = 0.08 | 0.12 | Remainder |
| | 24 | 0.45 | 0.08 | 0.01 | 0.01 | Ti + B = 0.04 | Ag = 0.15 | 0.19 | Remainder |
| | 25 | 0.21 | 0.08 | 0.01 | 0.01 | Ti + B = 0.04 | Cr = 0.22 | 0.26 | Remainder |
| | 26 | 0.21 | 0.08 | 0.01 | 0.01 | Ti + B = 0.04 | Ag = 0.06 | 0.10 | Remainder |
| | 27 | 0.24 | 0.06 | 0.21 | 0.11 | Ti + B = 0.04 | Mn = 0.06 | 0.10 | Remainder |
| | 28 | 0.24 | 0.06 | 0.21 | 0.11 | Ti + B = 0.04 | — | 0.04 | Remainder |
| | 29 | 1.22 | 0.06 | 0.12 | 0.07 | RE = 0.05 | — | 0.05 | Remainder |
| | 30 | 1.22 | 0.06 | 0.12 | 0.07 | RE = 0.05 | — | 0.05 | Remainder |
| | 31 | 0.18 | 0.02 | 0.01 | 0.01 | Ti + B = 0.04 | Zr = 0.06 | 0.10 | Remainder |

TABLE 1-continued

| | | Alloy composition [Mass %] | | | | | | | |
|---|---|---|---|---|---|---|---|---|---|
| | | | | | | | One or more selected from RE, Ag, Ni, Mn, Cr, Zr, Ti, and B | | Al and |
| | | Fe | Si | Cu | Mg | Component 1 | Component 2 | Total content | inevitable impurities |
| | 32 | 0.18 | 0.00 | 0.01 | 0.01 | Ti + B = 0.04 | — | 0.04 | Remainder |
| | 33 | 0.18 | 0.02 | 0.01 | 0.58 | Ti + B = 0.04 | — | 0.04 | Remainder |
| Comparative Example | 1 | <u>0.00</u> | <u>0.00</u> | <u>0.00</u> | <u>0.00</u> | — | — | — | Remainder |
| | 2 | 0.25 | <u>0.17</u> | 0.25 | 0.25 | Ti + B = 0.04 | — | 0.04 | Remainder |
| | 3 | <u>1.55</u> | 0.13 | 0.25 | 0.25 | Ti + B = 0.04 | — | 0.04 | Remainder |
| | 4 | 0.25 | 0.13 | <u>0.32</u> | 0.25 | Ti + B = 0.04 | — | 0.04 | Remainder |
| | 5 | 0.25 | 0.13 | 0.25 | <u>1.55</u> | Ti + B = 0.04 | — | 0.04 | Remainder |
| | 6 | 0.25 | 0.13 | 0.25 | 0.25 | Ti + B = 0.04 | Mn = 0.32 | <u>0.36</u> | Remainder |
| | 7 | 0.24 | 0.06 | 0.21 | 0.11 | Ti + B = 0.04 | — | 0.04 | Remainder |
| | 8 | 0.24 | 0.06 | 0.21 | 0.11 | Ti + B = 0.04 | — | 0.04 | Remainder |
| | 9 | 0.24 | 0.06 | 0.21 | 0.11 | Ti + B = 0.04 | — | 0.04 | Remainder |
| | 10 | 0.18 | 0.02 | 0.01 | 0.75 | Ti + B = 0.04 | — | 0.04 | Remainder |
| | 11 | 0.18 | 0.02 | 0.01 | 0.75 | Ti + B = 0.04 | — | 0.04 | Remainder |
| | 12 | 0.18 | 0.02 | 0.01 | 0.75 | Ti + B = 0.04 | — | 0.04 | Remainder |
| | 13 | 0.24 | 0.06 | 0.21 | 0.11 | Ti + B = 0.04 | — | 0.04 | Remainder |

(Note)
Underline in table indicates being out of proper range of present invention.

TABLE 2

| | | | Structure evaluation | | | Property evaluation | | | |
|---|---|---|---|---|---|---|---|---|---|
| | | Manufacturing condition | Presence or absence of fibrous metal structure | Average value of dimensions t of crystal grains in direction perpendicular to longitudinal direction of crystal grains [nm] | X-ray pole figure intensity ratio H | Tensile strength [MPa] | Vickers hardness HV | W bending workability | Conductivity [% IACS] |
| Example of present invention | 1 | B | Present | 230 | 1.55 | 310 | 85 | ○ 2 | 58.5 |
| | 2 | A | Present | 520 | 1.62 | 240 | 65 | ○ 3 | 57.3 |
| | 3 | C | Present | 140 | 0.52 | 360 | 102 | ○ 2 | 57.4 |
| | 4 | F | Present | 130 | 0.45 | 340 | 93 | ○ 2 | 57.8 |
| | 5 | A | Present | 510 | 1.53 | 230 | 62 | ○ 3 | 57.8 |
| | 6 | C | Present | 140 | 0.37 | 330 | 93 | ○ 1 | 58.1 |
| | 7 | D | Present | 530 | 1.57 | 220 | 62 | ○ 3 | 59.2 |
| | 8 | E | Present | 210 | 1.45 | 240 | 68 | ○ 2 | 59.2 |
| | 9 | C | Present | 160 | 0.19 | 220 | 62 | ○ 1 | 60.5 |
| | 10 | A | Present | 470 | 1.65 | 230 | 65 | ○ 3 | 58.2 |
| | 11 | D | Present | 480 | 1.35 | 240 | 68 | ○ 3 | 57.3 |
| | 12 | B | Present | 140 | 1.82 | 370 | 104 | ○ 1 | 47.8 |
| | 13 | B | Present | 180 | 1.32 | 350 | 95 | ○ 1 | 52.8 |
| | 14 | C | Present | 140 | 0.62 | 370 | 103 | ○ 2 | 56.2 |
| | 15 | A | Present | 540 | 1.64 | 230 | 62 | ○ 3 | 58.2 |
| | 16 | B | Present | 200 | 1.62 | 290 | 82 | ○ 2 | 56.2 |
| | 17 | C | Present | 130 | 0.55 | 350 | 97 | ○ 2 | 57.3 |
| | 18 | A | Present | 530 | 1.42 | 230 | 64 | ○ 3 | 57.4 |
| | 19 | C | Present | 150 | 0.22 | 290 | 82 | ○ 2 | 59.7 |
| | 19 | A | Present | 450 | 1.44 | 240 | 68 | ○ 3 | 57.2 |
| | 20 | B | Present | 190 | 1.52 | 290 | 82 | ○ 2 | 56.3 |
| | 21 | C | Present | 130 | 0.62 | 350 | 97 | ○ 2 | 57.2 |
| | 22 | D | Present | 450 | 1.45 | 240 | 67 | ○ 3 | 57.3 |
| | 23 | F | Present | 170 | 0.24 | 320 | 86 | ○ 2 | 59.1 |
| | 24 | A | Present | 460 | 1.82 | 220 | 61 | ○ 3 | 57.3 |
| | 25 | E | Present | 180 | 1.45 | 230 | 66 | ○ 2 | 56.8 |
| | 26 | C | Present | 150 | 0.25 | 360 | 102 | ○ 1 | 58.8 |
| | 27 | B | Present | 190 | 1.42 | 280 | 77 | ○ 2 | 57.2 |
| | 28 | B | Present | 230 | 0.69 | 300 | 84 | ○ 2 | 57.2 |
| | 29 | A | Present | 470 | 1.72 | 240 | 68 | ○ 3 | 58.1 |
| | 30 | B | Present | 210 | 1.47 | 280 | 76 | ○ 3 | 58.1 |
| | 31 | C | Present | 160 | 0.22 | 240 | 65 | ○ 1 | 60.5 |
| | 32 | C | Present | 160 | 0.24 | 240 | 65 | ○ 1 | 60.5 |
| | 33 | A | Present | 410 | 1.66 | 280 | 73 | ○ 3 | 55.2 |
| Comparative Example | 1 | C | Present | <u>900</u> | <u>0.12</u> | <u>165</u> | <u>42</u> | <u>x</u> | 61.8 |
| | 2 | B | Present | 230 | 0.81 | 320 | 87 | ○ 2 | <u>53.5</u> |
| | 3 | Disconnection | — | — | — | — | — | — | — |
| | 4 | B | Present | 240 | 0.76 | 310 | 85 | ○ 2 | <u>53.2</u> |

TABLE 2-continued

| | Manufacturing condition | Presence or absence of fibrous metal structure | Average value of dimensions t of crystal grains in direction perpendicular to longitudinal direction of crystal grains [nm] | X-ray pole figure intensity ratio H | Tensile strength [MPa] | Vickers hardness HV | W bending workability | Conductivity [% IACS] |
|---|---|---|---|---|---|---|---|---|
| 5 | B | Present | 130 | 1.87 | 380 | 104 | ○ 1 | <u>44.3</u> |
| 6 | C | Present | 140 | 0.59 | 370 | 105 | ○ 1 | <u>43.5</u> |
| 7 | <u>H</u> | Present | <u>1 µm or more</u> | 1.25 | <u>160</u> | <u>45</u> | ○ 2 | 57.2 |
| 8 | <u>I</u> | Present | 140 | <u>0.09</u> | 380 | 106 | <u>x</u> | 56.8 |
| 9 | <u>J</u> | Absent | <u>1 µm or more</u> | 1.33 | <u>140</u> | <u>36</u> | ○ 3 | 57.2 |
| 10 | <u>H</u> | present | <u>900</u> | 1.32 | <u>190</u> | <u>54</u> | ○ 2 | 53.1 |
| 11 | <u>I</u> | Present | 120 | <u>0.12</u> | 400 | 114 | <u>x</u> | 52.5 |
| 12 | <u>J</u> | Absent | <u>1 µm or more</u> | 1.45 | <u>160</u> | <u>46</u> | ○ 3 | 53.2 |
| 13 | <u>K</u> | Absent | <u>1 µm or more</u> | 0.84 | <u>150</u> | <u>42</u> | ○ 3 | 57.2 |

(Note)
Underline in table indicates being out of proper range of present invention and evaluation results not reaching acceptable level in this example.

From evaluation results of Table 2, it was checked that the aluminum alloy wire rods of Examples 1 to 33 of the present invention had the alloy composition in the proper range of the present invention, had the fibrous metal structure in which the crystal grains extended in one direction, had the average value of the dimensions of the crystal grains in the direction perpendicular to the longitudinal direction of 800 nm or less, and had the crystal orientation distribution in which the ratio H of K100 to K111 was 0.15 or more. FIG. 8 is the TEM image of the cross section parallel to the wire drawing direction of the aluminum alloy wire rod of Example 28 of the present invention. Note that, the same metal structure as that in FIG. 8 was also checked in the cross section parallel to the longitudinal direction, in the aluminum alloy wire rods according to Examples 1 to 27 and 29 to 33 of the present invention.

In all of the aluminum alloy wire rods according to Examples 1 to 33 of the present invention, having such a unique metal structure and a unique texture on the primary surface, the tensile strength was 220 MPa or more, the Vickers hardness HV was 60 or more, the W bending workability was excellent, and the conductivity was also excellent.

Figure 9:
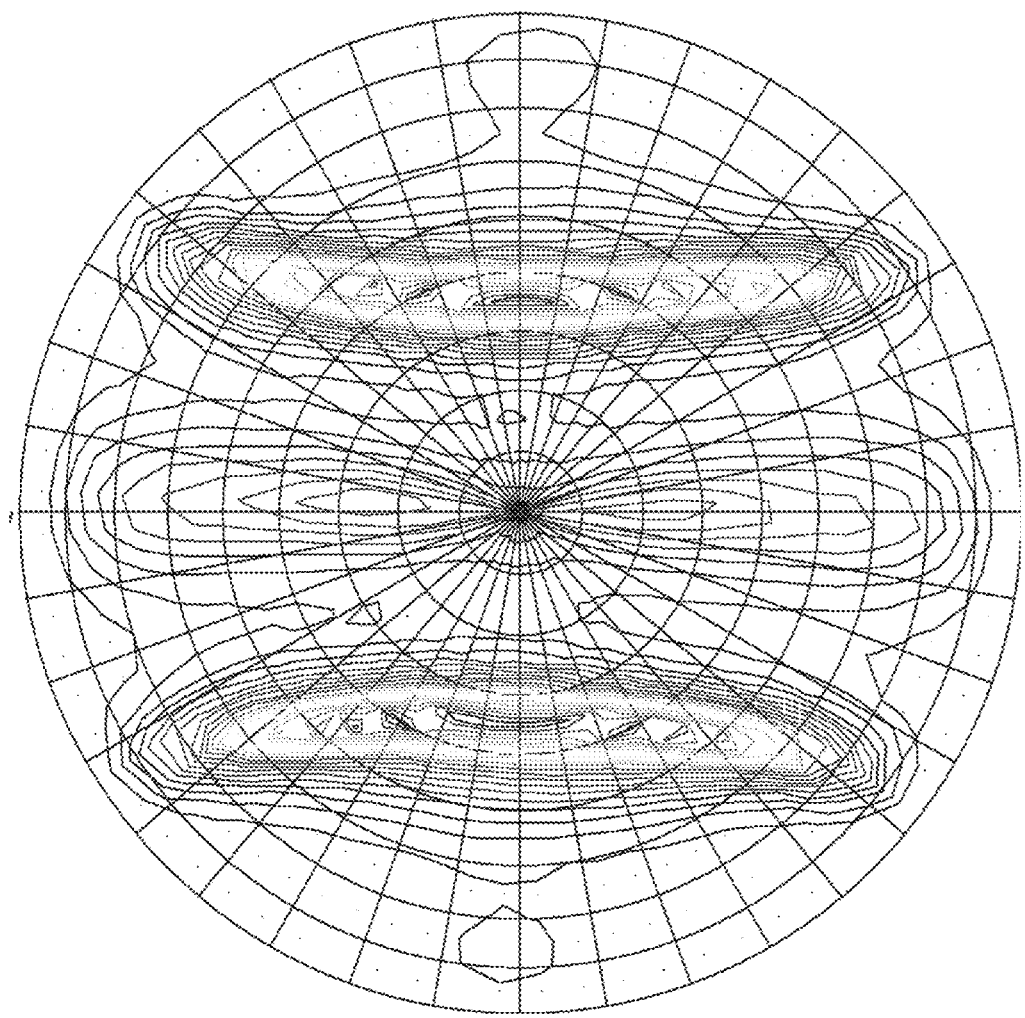
FIG. 9 is an X-ray pole figure obtained from Example 28 of the present invention.
Figure 10:
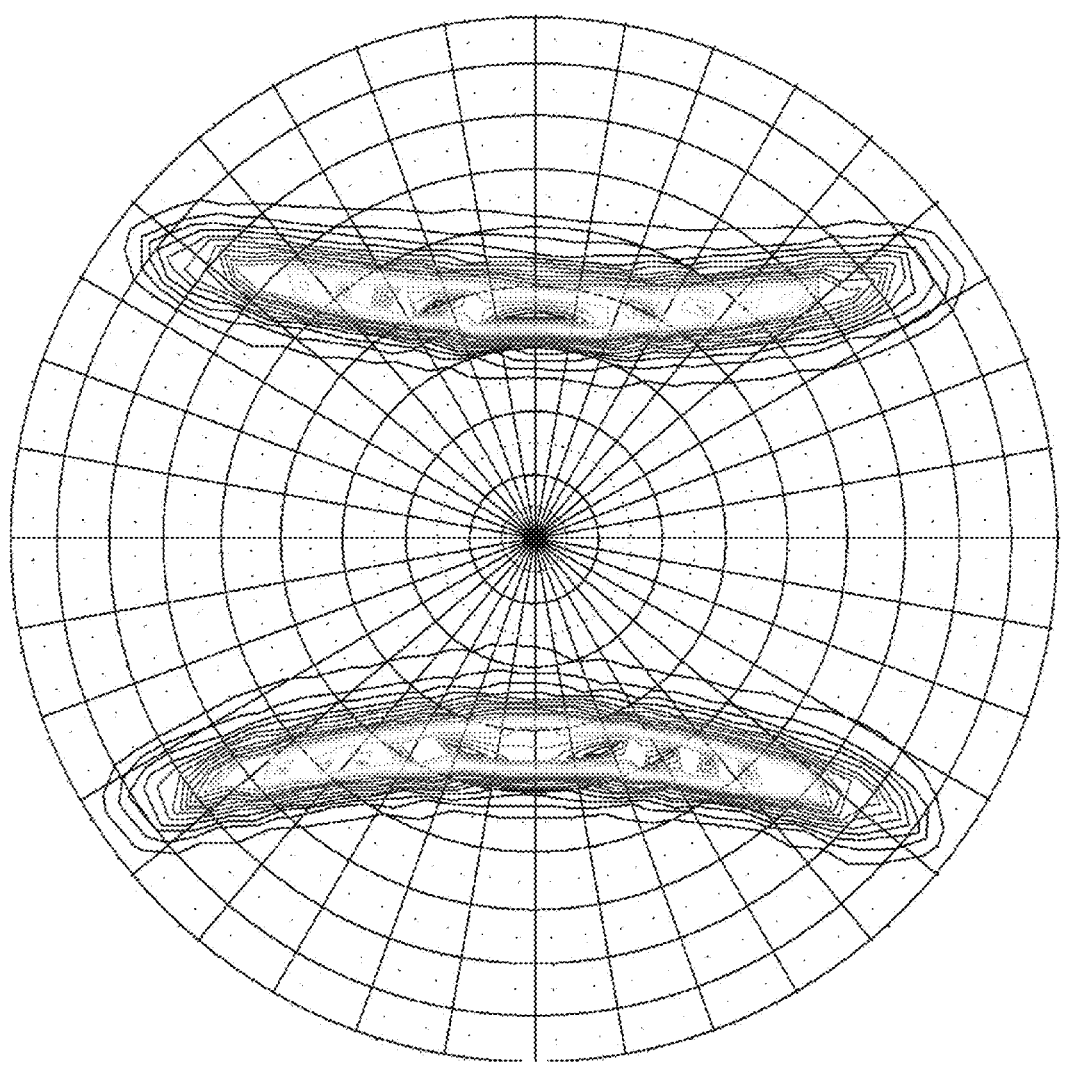
FIG. 10 is an X-ray pole figure obtained from Comparative Example 9.

In contrast, in the pure aluminum wire rod of Comparative Example 1, the composition was out of the proper range of the present invention, the average value of the dimensions t of the crystal grains in the direction perpendicular to the longitudinal direction was greater than 400 nm, and the ratio H of K100 to K111 was also less than 0.15, and thus, all of the tensile strength, the Vickers hardness, and the W bending workability were lower than the acceptable level. In the aluminum alloy wire rod of Comparative Example 2, the content of Si was greater than the proper range of the present invention, and thus, the conductivity was lower than the acceptable level. In the aluminum alloy wire rod of Comparative Example 3, the content of Fe was greater than the proper range of the present invention, and thus, the disconnection occurred at a high level, and a test piece was not capable of being prepared by the wire drawing working. In the aluminum alloy wire rod of Comparative Example 4, the content of Cu was greater than the proper range of the present invention, and thus, the conductivity was lower than the acceptable level. In the aluminum alloy wire rod of Comparative Example 5, the content of Mg was greater than the proper range of the present invention, and thus, the conductivity was lower than the acceptable level. In the aluminum alloy wire rod of Comparative Example 6, a total content of Ti, B, and Mn was greater than the proper range of the present invention, and thus, the conductivity was lower than the acceptable level. In all of Comparative Examples 7 to 13, the alloy composition was in the proper range of the present invention, but the manufacturing condition was out of the range of the present invention, and at least one of the average value of the dimensions t and the ratio H was out of the range of the present invention, and thus, at least one of the tensile strength, the Vickers hardness, and the workability was lower than the acceptable level. FIG. 9 is a (200) X-ray pole figure obtained from Example 28 of the present invention, and FIG. 10 is a (200) X-ray pole figure obtained from Comparative Example 9. From the results of FIGS. 9 and 10, in Example 28 of the present invention, the crystal orientation group of LD//<100> was developed, and the crystal orientation group of LD//<111> was also observed. On the other hand, it is found that in Comparative Example 9, only the crystal orientation group of LD//<111> is strongly integrated.

EXPLANATION OF REFERENCE NUMERALS

1 ALUMINUM ALLOY MATERIAL
10 CRYSTAL GRAINS
t DIMENSION OF CRYSTAL GRAINS IN DIRECTION PERPENDICULAR TO LONGITUDINAL DIRECTION OF CRYSTAL GRAINS
X LONGITUDINAL DIRECTION OF CRYSTAL GRAINS
W ALUMINUM ALLOY (WIRE) MATERIAL
M MEASUREMENT SAMPLE
I X-RAY GENERATOR
C DETECTOR
ND NORMAL DIRECTION OF SAMPLE SURFACE

The invention claimed is:

1. An aluminum alloy material having an alloy composition comprising at least one among 0.05 mass % to 1.50 mass % of Fe, 0.01 mass % to 0.15 mass % of Si, 0.01 mass % to 0.3 mass % of Cu, and 0.01 mass % to 1.5 mass % of Mg, with the balance being Al and inevitable impurities,
   wherein the aluminum alloy material has a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method.

2. An aluminum alloy material having an alloy composition comprising at least one among 0.05 mass % to 1.50 mass % of Fe, 0.01 mass % to 0.15 mass % of Si, 0.01 mass % to 0.3 mass % of Cu, and 0.01 mass % to 1.5 mass % of Mg, and a total of 0.3 mass % or less of one or more selected from the group consisting of RE, Ag, Ni, Mn, Cr, Zr, Ti, and B, with the balance being Al and inevitable impurities, wherein the aluminum alloy material has a fibrous metal structure in which crystal grains extend in one direction, in a cross section parallel to the one direction, an average value of dimensions of the crystal grains in a direction perpendicular to a longitudinal direction of the crystal grains is 800 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.15 or more as determined by an X-ray pole figure method.

3. The aluminum alloy material according to claim 1, wherein a Vickers hardness (HV) is 60 to 250.

4. The aluminum alloy material according to claim 1, wherein the surface is covered with one or more of metals or alloys selected from the group consisting of Cu, Ni, Ag, Au, Pd, and Sn.

5. A conductive member using the aluminum alloy material according to claim 1.

6. A battery member using the aluminum alloy material according to claim 1.

7. A fastening part using the aluminum alloy material according to claim 1.

8. A spring part using the aluminum alloy material according to claim 1.

9. A structural part using the aluminum alloy material according to claim 1.

10. A cabtire cable using the aluminum alloy material according to claim 1.

11. The aluminum alloy material according to claim 2, wherein a Vickers hardness (HV) is 60 to 250.

12. The aluminum alloy material according to claim 2, wherein the surface is covered with one or more of metals or alloys selected from the group consisting of Cu, Ni, Ag, Au, Pd, and Sn.

13. A conductive member using the aluminum alloy material according to claim 2.

14. A battery member using the aluminum alloy material according to claim 2.

15. A fastening part using the aluminum alloy material according to claim 2.

16. A spring part using the aluminum alloy material according to claim 2.

17. A structural part using the aluminum alloy material according to claim 2.

18. A cabtire cable using the aluminum alloy material according to claim 2.

19. The aluminum alloy material according to claim 3, wherein the surface is covered with one or more of metals or alloys selected from the group consisting of Cu, Ni, Ag, Au, Pd, and Sn.

20. A conductive member using the aluminum alloy material according to claim 3.

* * * * *